(12) United States Patent
Kim

(10) Patent No.: US 11,907,098 B2
(45) Date of Patent: Feb. 20, 2024

(54) METHOD FOR MEASURING PERFORMANCE OF NEURAL PROCESSING DEVICE AND DEVICE FOR MEASURING PERFORMANCE

(71) Applicant: Rebellions Inc., Seongnam-si (KR)

(72) Inventor: Jinseok Kim, Seongnam-si (KR)

(73) Assignee: Rebellions Inc., Seongnam-si (KR)

( * ) Notice: Subject to any disclaimer, the term of this patent is extended or adjusted under 35 U.S.C. 154(b) by 0 days.

(21) Appl. No.: 18/191,731

(22) Filed: Mar. 28, 2023

(65) Prior Publication Data

US 2023/0315608 A1    Oct. 5, 2023

(30) Foreign Application Priority Data

Apr. 1, 2022   (KR) .................. 10-2022-0041117
Feb. 24, 2023  (KR) .................. 10-2023-0025122

(51) Int. Cl.
*G06F 11/34*     (2006.01)
*G06F 15/78*     (2006.01)

(52) U.S. Cl.
CPC ...... *G06F 11/3495* (2013.01); *G06F 11/3404* (2013.01); *G06F 11/3409* (2013.01); *G06F 11/3447* (2013.01); *G06F 15/781* (2013.01)

(58) Field of Classification Search
CPC ............ G06F 11/3495; G06F 11/3404; G06F 11/3409; G06F 11/3447; G06F 15/781
USPC ........................................................ 709/224
See application file for complete search history.

(56) References Cited

U.S. PATENT DOCUMENTS

| | | | |
|---|---|---|---|
| 11,228,505 B1 * | 1/2022 | Wang ................. | G06N 5/01 |
| 2004/0193559 A1 * | 9/2004 | Hoya ................. | G06N 3/04 |
| | | | 706/27 |
| 2006/0167667 A1 * | 7/2006 | Maturana ......... | G05B 19/41885 |
| | | | 703/6 |
| 2021/0342701 A1 * | 11/2021 | Ayush .............. | G06Q 30/0631 |

FOREIGN PATENT DOCUMENTS

| | | | | |
|---|---|---|---|---|
| CN | 110515739 A | * | 10/2019 | ......... G06F 9/5027 |
| KR | 10-2017-0012019 A | | 2/2017 | |
| KR | 10-2020-0029661 A | | 3/2020 | |
| KR | 10-2020-0052417 A | | 5/2020 | |
| KR | 10-2258566 B1 | | 6/2021 | |
| KR | 10-2021-0141323 A | | 11/2021 | |
| KR | 10-2022-0011681 A | | 1/2022 | |
| WO | 2020/045204 A1 | | 3/2020 | |
| WO | 2022/230702 A1 | | 11/2022 | |

* cited by examiner

*Primary Examiner* — Tan Doan
(74) *Attorney, Agent, or Firm* — BROADVIEW IP LAW, PC

(57) ABSTRACT

A method for measuring performance of neural processing devices and devices for measuring performance are provided. The method for measuring performance of neural processing devices comprises receiving hardware information of a neural processing device, modeling hardware components according to the hardware information as agents, dividing a calculation task by events for the agents and modeling the calculation task, thereby generating an event model which includes nodes corresponding to the agents and edges corresponding to the events and measuring a total duration of the calculation task through simulation of the event model.

20 Claims, 35 Drawing Sheets

FIG. 21

| Clock frequency | Neural Core |
| --- | --- |
| | Interconnection |
| Memory size | L0 Memory |
| | L1/L2 Memory |
| | Off-chip Memory |
| Initial latency | L0 Memory<->L1/L2 Memory |
| | L0 Memory<->L0 Memory(L1 interconnection) |
| | L0/L1/L2 Memory<->Off-chip Memory |
| Total bandwidth | L0 Memory(@ f1 GHz) |
| | L1/L2 Memory(@ f2 GHz) |
| | Off-chip Memory(@ f3 GHz) |
| Max MO | L0/L1/L2 Interconnection |
| | VM IF |
| Max bandwidth | NCLU |
| | NCSU, uDMA |
| | dDMA |

METHOD FOR MEASURING PERFORMANCE OF NEURAL PROCESSING DEVICE AND DEVICE FOR MEASURING PERFORMANCE

CROSS-REFERENCE TO RELATED APPLICATION

This application claims priority under 35 U.S.C § 119 to Korean Patent Application No. 10-2022-0041117 filed on Apr. 1, 2022, now KR Patent No. 10-2506622 issued on Feb. 28, 2023, and Korean Patent Application No. 10-2023-0025122 filed on Feb. 24, 2023, in the Korean Intellectual Property Office, the entire contents of which are hereby incorporated by reference.

TECHNICAL FIELD

The disclosure relates to a method for measuring performance of a neural processing device and a device for measuring performance. More particularly, the disclosure relates to a method for measuring performance of a neural processing device and a device for measuring performance that is capable of measuring performance through abstraction.

BACKGROUND

For the last few years, artificial intelligence technology has been the core technology of the Fourth Industrial Revolution and the subject of discussion as the most promising technology worldwide. The biggest problem with artificial intelligence technology is computing performance. For artificial intelligence technology to realize a level of human learning ability, reasoning ability, perceptual ability, natural language implementation ability, etc., it is of the utmost importance to process a large amount of data quickly.

The central processing unit (CPU) or graphics processing unit (GPU) of off-the-shelf computers was used to implement deep-learning training and inference in early artificial intelligence, but these components had limitations in their ability to perform the tasks of deep-learning training and inference with high workloads. Thus, neural processing units (NPUs) that are structurally specialized for deep learning tasks have received a lot of attention.

In order to design and produce a neural processing unit and to measure its performance, operations of tens of thousands to hundreds of thousands of cycles are needed, in addition to a very long time and many resources. In addition, the method of simulating using a virtual device before producing an actual product may still require too much time to measure the operating time.

Therefore, there is a need for a method for measuring performance capabilities through abstraction by estimating performance using only hardware specifications.

The description set forth in the background section should not be assumed to be prior art merely because it is set forth in the background section. The background section may describe aspects or embodiments of the disclosure.

SUMMARY

Aspects of the disclosure provide a method for measuring performance of a neural processing device that is capable of measuring performance.

Aspects of the disclosure provide a device for measuring performance that is capable of measuring performance.

According to some aspects, a method for measuring performance of a neural processing device comprises receiving hardware information of the neural processing device, modeling hardware components according to the hardware information as agents, dividing a calculation task by events for the agents and modeling the calculation task, thereby generating an event model which includes nodes corresponding to the agents and edges corresponding to the events, and measuring a total duration of the calculation task through simulation of the event model.

According to some aspects, generating the event model comprises generating a pre-event model that comprises at least one undetermined duration and in which the nodes and the edges are formed, wherein each of the at least one undetermined duration comprises a fixed duration determined according to the hardware information and a bandwidth duration determined by at least one bandwidth, computing the fixed duration, estimating the bandwidth duration, and determining a value of each of the at least one undetermined duration through the fixed duration and the bandwidth duration and converting each of the at least one undetermined duration into a final duration.

According to some aspects, estimating the bandwidth duration comprises distributing a value of a total read bandwidth of each of the nodes evenly to a value of a read bound of each of the edges departing from each of the nodes, distributing a value of a total write bandwidth of each of the nodes evenly to a value of a write bound of each of the edges arriving at each of the nodes, determining a minimum value of each of the edges out of the read bound, the write bound, and an individual bound determined according to the hardware information as a final bandwidth, and estimating the bandwidth duration according to the determined final bandwidth.

According to some aspects, determining the minimum value as the final bandwidth comprises determining the individual bound as the final bandwidth of at least one of the edges whose individual bound is smaller than the read bound and the write bound and resetting the read bound and the write bound evenly except for the at least one of the edges whose final bandwidth has been determined.

According to some aspects, determining the minimum value as the final bandwidth comprises if there is no edge whose individual bound is smaller than the read bound and the write bound, and the read bound of each of all the edges departing from one node is less than or equal to the write bound of each of all the edges, determining the read bound of each of the edges as the final bandwidth of each of all the edges, and resetting the write bound evenly except for edges whose final bandwidth has been determined.

According to some aspects, determining the minimum value as the final bandwidth comprises if there is no edge whose individual bound is smaller than the read bound and the write bound, and the write bound of each of all the edges arriving at one node is less than or equal to the read bound of each of all the edges, determining the write bound of each of all edges as the final bandwidth of each of all the edges and resetting the read bound evenly except for edges whose final bandwidth has been determined.

According to some aspects, the event comprises a compute job and a memory job, a duration of the compute job is determined according to the hardware information, a duration of the memory job comprises an initial latency determined according to the hardware information and the bandwidth duration determined dynamically according to a final bandwidth, and the fixed duration comprises the duration of the compute job and the initial latency.

According to some aspects, measuring the total duration comprises advancing time by the final duration of an edge that is completed the earliest among the edges and removing the edge that is completed the earliest, computing the final duration of each of all the edges again, and measuring the total duration by adding up the advanced time if all the edges have been removed.

According to some aspects, the hardware information comprises at least one of a clock frequency, a memory size, an initial latency, a total bandwidth, a maximum multiple outstanding, or a maximum bandwidth.

According to some aspects, the hardware information comprises at least one of system specifications or design specifications before implementation of the neural processing device.

According to some aspects, a device for measuring performance comprises a hardware modeling module configured to receive hardware information of a neural processing device and generate a hardware model by modeling hardware components as agents, an event modeling module configured to receive the hardware information and a calculation task and generate an event model by dividing the calculation task by events for the agents based on the hardware model, and an event simulation module configured to measure performance of the neural processing device by simulating the event model.

According to some aspects, the agents comprise core agents for processing units included in the neural processing device and memory agents for memories included in the neural processing device.

According to some aspects, each of the events comprises a compute job performed by the core agents and a memory job according to data transfer between the memory agents.

According to some aspects, each of the memory agents comprises at least one load unit agent and at least one store unit agent, which are present in each of the memories.

According to some aspects, the event modeling module comprises an event model generating module configured to generate a first pre-event model according to the hardware model by dividing the calculation task by the events, wherein the first pre-event model comprises nodes corresponding to the agents and edges corresponding to the events, and durations of the edges are undetermined, a calculation module configured to generate a second pre-event model by computing fixed values out of the durations of the first pre-event model according to the hardware information, a bandwidth estimation module configured to generate a third pre-event model by determining bandwidth durations of the second pre-event model, and a duration decision module configured to receive the third pre-event model to determine final durations, and generate the event model.

According to some aspects, the event simulation module advances time by one of the final durations, each of the final durations is associated with each of the edges, which the final duration of an edge is completed the earliest among the edges of the event model, removes the edge whose final duration is completed the earliest, and computes the final durations of all the edges again.

According to some aspects, the neural processing device comprises a CPU configured to perform a first calculation, a neural core SoC configured to perform a second calculation that is different from the first calculation, and an off-chip memory configured to store data of the CPU and the neural core SoC.

According to some aspects, the neural core SoC comprises at least one neural processor, a shared memory shared by the neural processor, and a global interconnection configured to transmit data between the at least one neural processor and the shared memory.

According to some aspects, the global interconnection comprises a data channel configured to transmit data, a control channel configured to transmit control signals, and an L3 sync channel configured to transmit synchronization signals.

According to some aspects, the event simulation module measures a total duration by taking durations of synchronization durations into account.

Aspects of the disclosure are not limited to those mentioned above and other objects and advantages of the disclosure that have not been mentioned can be understood by the following description and will be more clearly understood according to embodiments of the disclosure. In addition, it will be readily understood that the objects and advantages of the disclosure can be realized by the means and combinations thereof set forth in the claims.

The method for measuring performance of a neural processing device and the device for measuring performance of the disclosure can measure the performance of a device relatively accurately in advance before the hardware is developed.

In addition, the time required for measuring performance can be significantly reduced.

In addition to the foregoing, the specific effects of the disclosure will be described together while elucidating the specific details for carrying out the embodiments below.

BRIEF DESCRIPTION OF THE DRAWINGS

FIG. 21 is a table showing hardware information in accordance with FIG. 1;

DETAILED DESCRIPTION OF THE PREFERRED EMBODIMENTS

Figure 1:
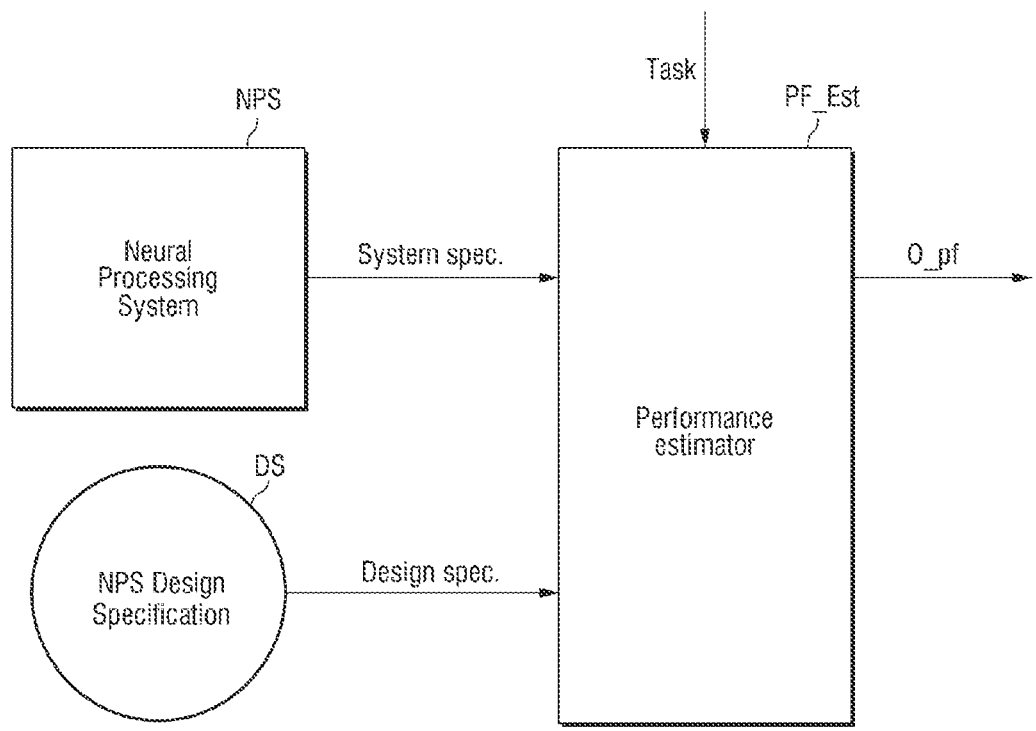
FIG. 1 is a block diagram showing a device for measuring performance in accordance with some embodiments.

The terms or words used in the disclosure and the claims should not be construed as limited to their ordinary or lexical meanings. They should be construed as the meaning and concept in line with the technical idea or concept according to the disclosure based on the principle that the inventor can act as his or her own lexicographer and define the terms or words in order to describe his/her own embodiments in the best possible manner. Further, since the embodiments described herein and the configurations illustrated in the drawings are merely example embodiments in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are used only for the purpose of distinguishing one component from another. For example, a first component may be referred to as a second component, and similarly, a second component may be referred to as a first component in various embodiments, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular expressions include plural expressions unless the context explicitly indicates otherwise. In the application, terms such as "comprise," "have," "include", "contain," etc. should be understood as not precluding the possibility of existence or addition of features, numbers, steps, operations, components, parts, or combinations thereof described herein.

Unless otherwise defined, the phrases "A, B, or C," "at least one of A, B, or C," or "at least one of A, B, and C" may refer to only A, only B, only C, both A and B, both A and C, both B and C, all of A, B, and C, or any combination thereof.

The term "module" or "unit" as used herein may refer to, but is not limited to, software or hardware component(s) or combinations thereof. A "module" or "unit" performs certain operations. The "modules" or "units" may be configured to reside on an addressable storage medium and/or be configured to be executed or implemented on processing circuitry or via one or more processors. Furthermore, operations of the "modules" or "units" may be combined into fewer "modules" or "units," or further separated into more "modules" or "units."

Unless otherwise defined, all terms used herein, including technical or scientific terms, have the same meaning as commonly understood by those of ordinary skill in the art to which the disclosure pertains.

Terms such as those defined in commonly used dictionaries should be construed as having a meaning consistent with the meaning in the context of the relevant art and are not to be construed in an ideal or excessively formal sense unless explicitly defined in the disclosure.

In addition, each configuration, procedure, process, method, or the like included in each embodiment of the disclosure may be shared to the extent that they are not technically contradictory to each other.

Hereinafter, neural processing devices in accordance with some embodiments of the disclosure will be described with reference to FIGS. 1 to 35.

FIG. 1 is a block diagram showing a device for measuring performance in accordance with some embodiments.

Referring to FIG. 1, a performance estimator PF_Est may receive hardware information System spec. and/or Design spec. from a neural processing system NPS or a neural processing system design specification DS, respectively. In this case, the neural processing system NPS may refer to a system that has already been implemented. Conversely, the neural processing system design specification DS may refer to a specification that has not been implemented yet but is only a design.

The hardware information System spec. and Design spec. may include: system specifications System spec. of the neural processing system NPS and design specifications Design spec. of the neural processing system design specification DS. The performance estimator PF_Est may receive system specifications System spec., which is or includes information that has already been implemented, from neural processing system NPS, and may receive design specifications Design specs., which is or includes information that has not yet been implemented, from the neural processing system design specification DS. Part of the hardware information System spec. and Design spec. received by the performance estimator PF_Est may be implemented system specifications System spec., and part of it may be design specifications Design spec. that have not been implemented.

Performance estimator PF_Est may receive a calculation task Task. The performance estimator PF_Est may receive the hardware information System spec. and/or Design spec. and the calculation task Task, and measure the performance when a device according to the hardware information System spec. and/or Design spec. performs the calculation task Task. That is, the performance estimator PF_Est can output the measured performance, i.e., the performance measurement result O_pf.

In the following, FIGS. 2 to 20 describes a neural processing system.

Figure 2:
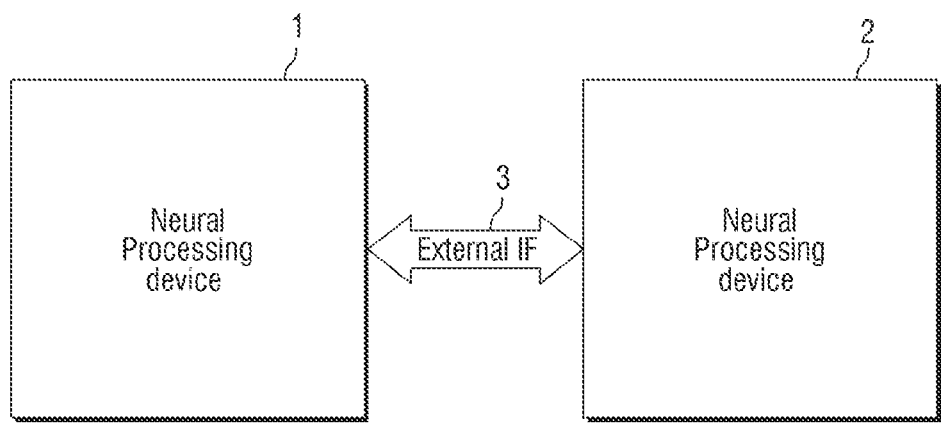
FIG. 2 is a block diagram showing a neural processing system in accordance with some embodiments.

FIG. 2 is a block diagram showing a neural processing system in accordance with some embodiments.

Referring to FIG. 2, a neural processing system NPS in accordance with some embodiments may include a first neural processing device 1, a second neural processing device 2, and an external interface 3.

The first neural processing device 1 may be a device that performs calculations using an artificial neural network. The first neural processing device 1 may be, for example, a device specialized in performing tasks of deep learning calculations. However, the embodiment is not limited thereto.

The second neural processing device 2 may be a device having the same or similar configuration as the first neural processing device 1. The first neural processing device 1 and the second neural processing device 2 may be connected to each other via the external interface 3 and share data and control signals.

Although FIG. 1 shows two neural processing devices, the neural processing system NPS in accordance with some embodiments is not limited thereto. That is, in a neural processing system NPS in accordance with some embodiments, three or more neural processing devices may be connected to each other via the external interface 3. Also, conversely, a neural processing system NPS in accordance with some embodiments may include only one neural processing device.

Figure 3:
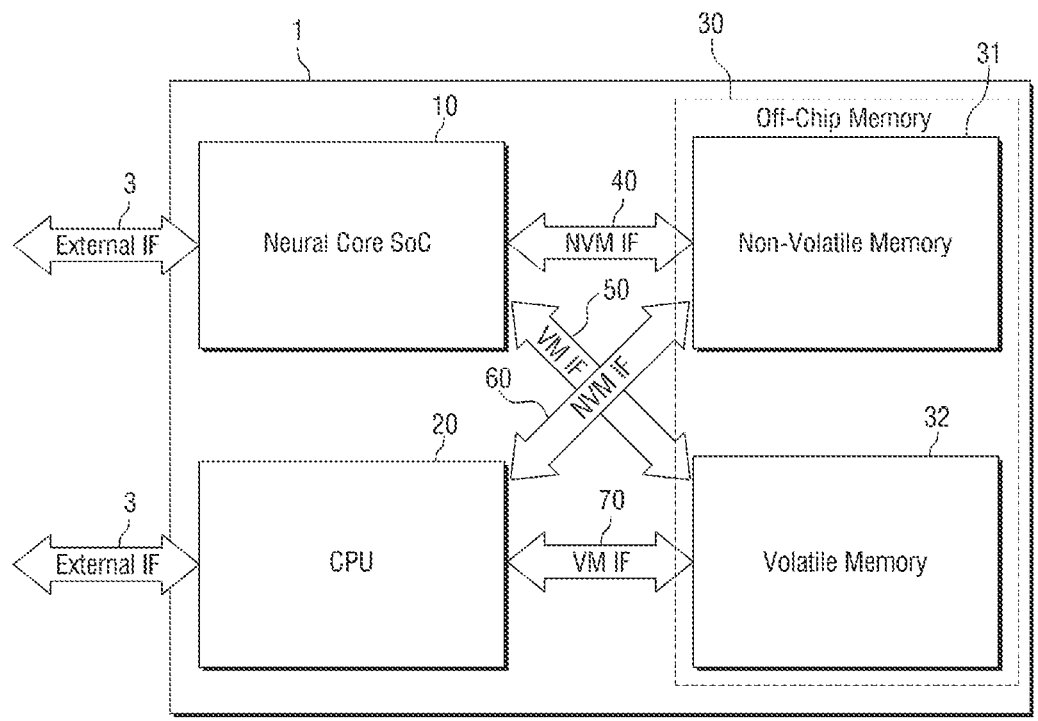
FIG. 3 is a block diagram showing a neural processing device in accordance with FIG. 2.

FIG. 3 is a block diagram showing a neural processing device in accordance with FIG. 2.

Referring to FIG. 3, a first neural processing device 1 may include a neural core SoC 10, a CPU 20, an off-chip memory 30, a first non-volatile memory interface 40, a first volatile memory interface 50, a second non-volatile memory interface 60, and a second volatile memory interface 70.

The neural core SoC 10 may be a system on a chip device. The neural core SoC 10 can be an artificial intelligence calculation device and may be an accelerator. The neural core SoC 10 may be, for example, any one of a graphics processing unit (GPU), a field-programmable gate array (FPGA), or an application-specific integrated circuit (ASIC). However, the embodiment is not limited thereto.

The neural core SoC 10 may exchange data with other external calculation devices via the external interface 3. Further, the neural core SoC 10 may be connected to the non-volatile memory 31 and the volatile memory 32 via the first non-volatile memory interface 40 and the first volatile memory interface 50, respectively.

The CPU 20 may be a control device that controls the system of the first neural processing device 1 and executes program calculations. The CPU 20 is a general-purpose calculation device and may have low efficiency in performing simple parallel calculations that are frequently used in deep learning. Accordingly, there can be high efficiency by performing calculations in deep learning inference and training tasks by the neural core SoC 10.

The CPU 20 may exchange data with other external calculation units via the external interface 3. Further, the CPU 20 may be connected to the non-volatile memory 31 and the volatile memory 32 via the second non-volatile memory interface 60 and the second volatile memory interface 70, respectively. The neural core SoC 10 may perform different calculation tasks from the CPU 20.

The off-chip memory 30 may be a memory disposed outside the chip of the neural core SoC 10. The off-chip memory 30 may include a non-volatile memory 31 and a volatile memory 32.

The non-volatile memory 31 may be a memory that continuously retains stored information even if electric power is not supplied. The non-volatile memory 31 may include, for example, at least one of Read-Only Memory (ROM), Programmable Read-Only Memory (PROM), Erasable Alterable ROM (EAROM), Erasable Programmable Read-Only Memory (EPROM), Electrically Erasable Programmable Read-Only Memory (EEPROM) (e.g., NAND Flash memory, NOR Flash memory), Ultra-Violet Erasable Programmable Read-Only Memory (UVEPROM), Ferroelectric Random-Access Memory (FeRAM), Magnetoresistive Random-Access Memory (MRAM), Phase-change Random-Access Memory (PRAM), silicon-oxide-nitride-oxide-silicon (SONOS), Resistive Random-Access Memory (RRAM), Nanotube Random-Access Memory (NRAM), magnetic computer storage devices (e.g., hard disks, diskette drives, magnetic tapes), optical disc drives, or 3D XPoint memory. However, the embodiment is not limited thereto.

The volatile memory 32 may be a memory that continuously requires electric power to retain stored information, unlike the non-volatile memory 31. The volatile memory 32 may include, for example, at least one of Dynamic Random-Access Memory (DRAM), Static Random-Access Memory (SRAM), Synchronous Dynamic Random-Access Memory (SDRAM), or Double Data Rate SDRAM (DDR SDRAM). However, the embodiment is not limited thereto.

Each of the first non-volatile memory interface 40 and the second non-volatile memory interface 60 may include, for example, at least one of Parallel Advanced Technology Attachment (PATA), Small Computer System Interface (SCSI), Serial Attached SCSI (SAS), Serial Advanced Technology Attachment (SATA), or PCI Express (PCIe). However, the embodiment is not limited thereto.

Each of the first volatile memory interface 50 and the second volatile memory interface 70 may be, for example, at least one of SDR (Single Data Rate), DDR (Double Data Rate), QDR (Quad Data Rate), or XDR (eXtreme Data Rate, Octal Data Rate). However, the embodiment is not limited thereto.

Figure 4:
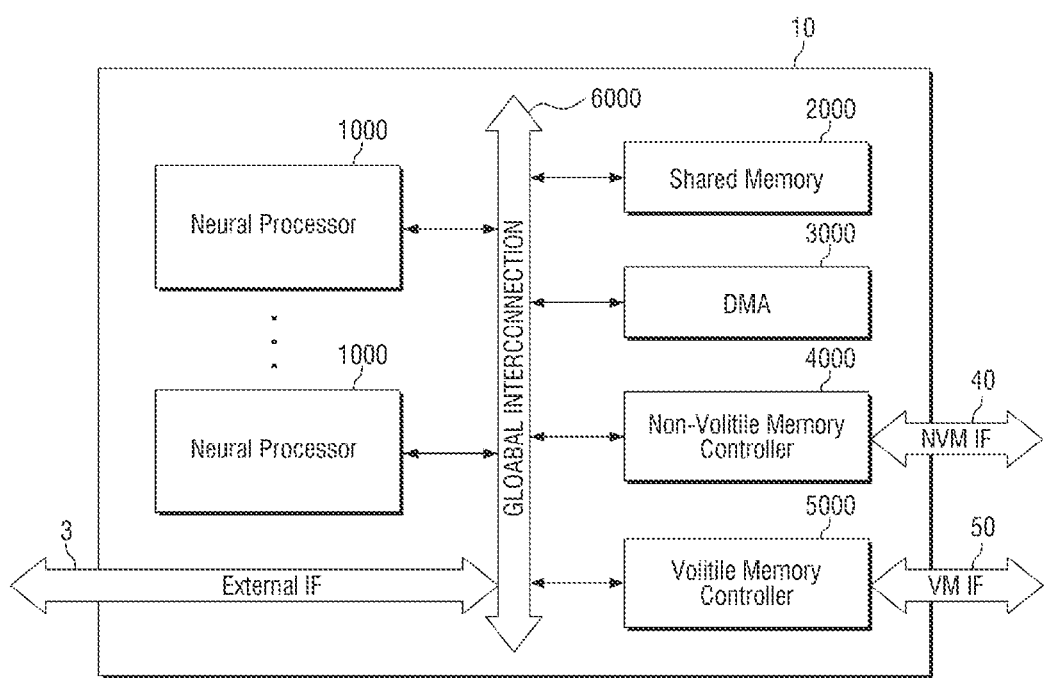
FIG. 4 is a block diagram showing a neural core SoC in accordance with FIG. 3.

FIG. 4 is a block diagram showing a neural core SoC in accordance with FIG. 3.

Referring to FIGS. 3 and 4, the neural core SoC 10 may include at least one neural processor 1000, a shared memory 2000, direct memory access (DMA) 3000, a non-volatile memory controller 4000, a volatile memory controller 5000, and a global interconnection 6000.

The neural processor 1000 may be a calculation device that directly performs calculation tasks. If there exist neural processors 1000 in plurality, calculation tasks may be assigned to respective neural processors 1000. The respective neural processors 1000 may be connected to each other via the global interconnection 6000.

The shared memory 2000 may be a memory shared by multiple neural processors 1000. The shared memory 2000 may store data of each neural processor 1000. In addition, the shared memory 2000 may receive data from the off-chip memory 30, store the data temporarily, and transfer the data to each neural processor 1000. The shared memory 2000 may also receive data from the neural processor 1000, store the data temporarily, and transfer the data to the off-chip memory 30 of FIG. 3.

The shared memory 2000 may be required to be a relatively high-speed memory. Accordingly, the shared memory 2000 may include, for example, an SRAM. However, the embodiment is not limited thereto. That is, the shared memory 2000 may include a DRAM as well.

The shared memory 2000 may be a memory corresponding to the SoC level, i.e., level 3 (L3). Accordingly, the shared memory 2000 may also be defined as an L3 shared memory.

The DMA 3000 may directly control the movement of data without the need for the neural processor 1000 to control the input/output of data. Accordingly, the DMA 3000 may control the data movement between memories, thereby minimizing the number of interrupts of the neural processor 1000.

The DMA 3000 may control the data movement between the shared memory 2000 and the off-chip memory 30. Via the authority of the DMA 3000, the non-volatile memory controller 4000 and the volatile memory controller 5000 may perform the movement of data.

The non-volatile memory controller 4000 may control the task of reading from or writing onto the non-volatile memory 31. The non-volatile memory controller 4000 may control the non-volatile memory 31 via the first non-volatile memory interface 40.

The volatile memory controller 5000 may control the task of reading from or writing onto the volatile memory 32. Further, the volatile memory controller 5000 may perform a refresh task of the volatile memory 32. The volatile memory controller 5000 may control the volatile memory 32 via the first volatile memory interface 50.

The global interconnection 6000 may connect the at least one neural processor 1000, the shared memory 2000, the DMA 3000, the non-volatile memory controller 4000, and the volatile memory controller 5000 to one another. In addition, the external interface 3 may also be connected to the global interconnection 6000. The global interconnection 6000 may be a path through which data travels between the at least one neural processor 1000, the shared memory 2000, the DMA 3000, the non-volatile memory controller 4000, the volatile memory controller 5000, and the external interface 3.

The global interconnection 6000 may transmit not only data but also control signals and may transmit a signal for synchronization. That is, in the neural processing device in accordance with some embodiments, each neural processor 1000 may directly transmit and receive a synchronization signal, instead of a separate control processor managing the synchronization signal. Accordingly, it is possible to preclude the latency of the synchronization signal generated by the control processor.

In other words, if there exist neural processors 1000 in plurality, there may be dependencies of individual tasks in which the task of one neural processor 1000 needs to be finished before the next neural processor 1000 can start a new task. The end and start of these individual tasks can be checked and/or coordinated via a synchronization signal, and in conventional techniques, a control processor performed the reception of such a synchronization signal and an instruction to start a new task.

However, as the number of neural processors 1000 increases and task dependencies are designed more complicatedly, the number of requests and instructions for this synchronization task can increase exponentially. Therefore, the latency resulting from each request and instruction can greatly reduce the efficiency of tasks.

Accordingly, in the neural processing device in accordance with some embodiments, each neural processor 1000, instead of the control processor, may directly transmit a synchronization signal to another neural processor 1000 according to the dependency of a task. In this case, several neural processors 1000 can perform the synchronization tasks in parallel as compared with the method managed by the control processor, thereby minimizing the latency due to synchronization.

In addition, the control processor needs to perform the task scheduling of the neural processors 1000 according to a task dependency, and the overhead of such scheduling may increase significantly as the number of neural processors 1000 increases. Accordingly, in the neural processing device, in accordance with some embodiments, the scheduling task is also performed by the individual neural processors 1000, and thus, the performance of the neural processing device can be improved without resulting in an additional scheduling burden.

Figure 5:
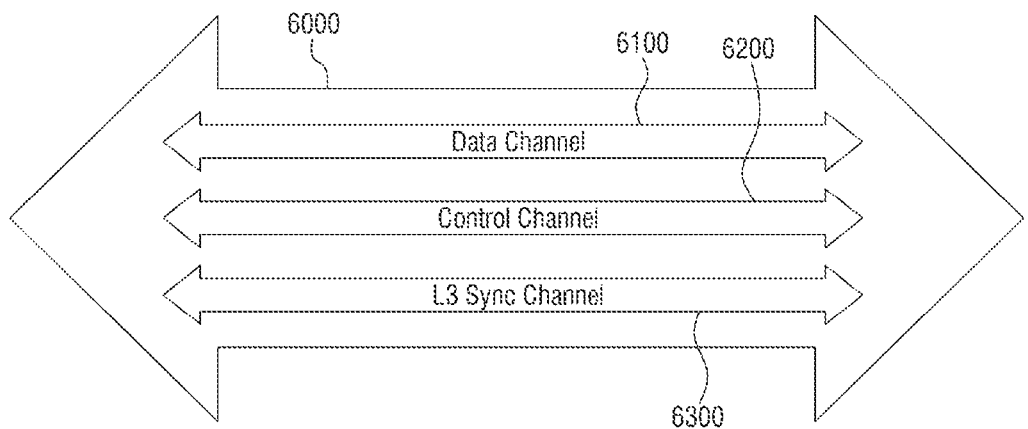
FIG. 5 is a structural diagram showing a global interconnection in accordance with FIG. 4.

FIG. 5 is a structural diagram showing a global interconnection in accordance with FIG. 4.

Referring to FIG. 5, the global interconnection 6000 may include a data channel 6100, a control channel 6200, and an L3 sync channel 6300.

The data channel 6100 may be a dedicated channel for transmitting data. Through the data channel 6100, the at least one neural processor 1000, the shared memory 2000, the DMA 3000, the non-volatile memory controller 4000, the volatile memory controller 5000, and the external interface 3 may exchange data with one another.

The control channel 6200 may be a dedicated channel for transmitting control signals. Through the control channel 6200, the at least one neural processor 1000, the shared memory 2000, the DMA 3000, the non-volatile memory controller 4000, the volatile memory controller 5000, and the external interface 3 may exchange control signals with one another.

The L3 sync channel 6300 may be a dedicated channel for transmitting synchronization signals. Through the L3 sync channel 6300, the at least one neural processor 1000, the shared memory 2000, the DMA 3000, the non-volatile memory controller 4000, the volatile memory controller 5000, and the external interface 3 may exchange synchronization signals with one another.

The L3 sync channel 6300 may be set as a dedicated channel inside the global interconnection 6000, and thus, may not overlap with other channels and transmit synchronization signals quickly. Accordingly, the neural processing device in accordance with some embodiments does not require new wiring work and may smoothly perform the synchronization task by using the global interconnection 6000.

Figure 6:
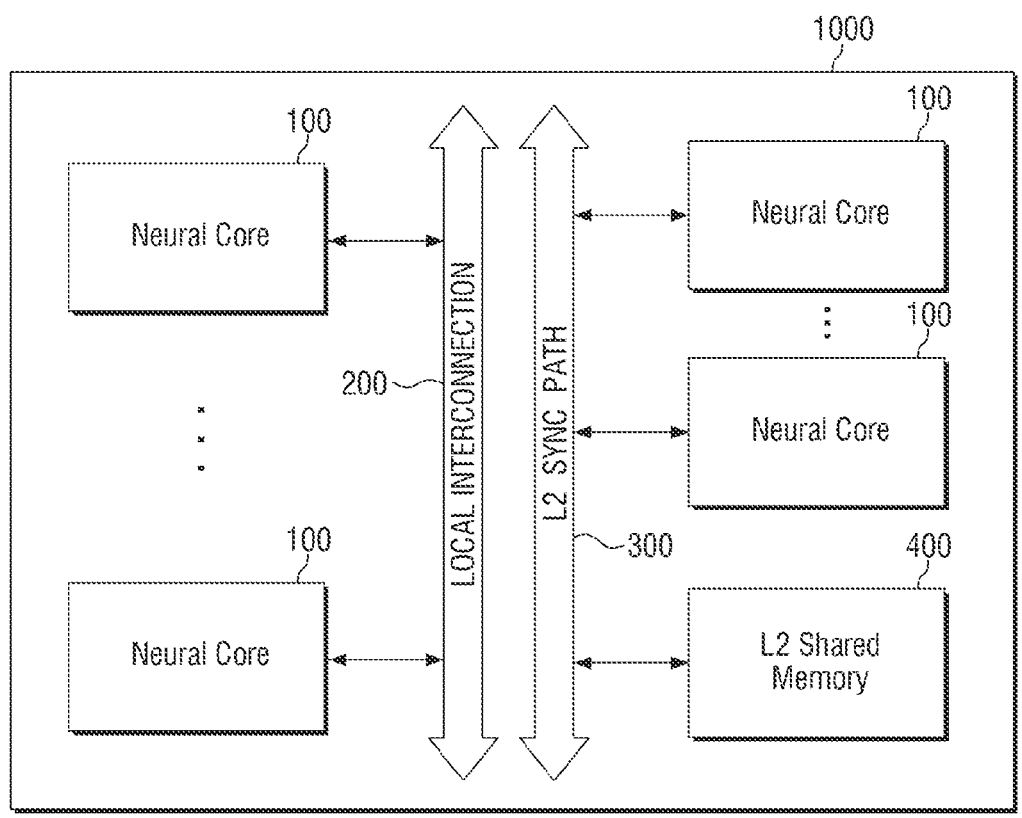
FIG. 6 is a block diagram showing a neural processor in accordance with FIG. 4.

FIG. 6 is a block diagram showing a neural processor in accordance with FIG. 4.

Referring to FIGS. 4 to 6, a neural processor 1000 may include at least one neural core 100, an L2 shared memory 400, a local interconnection 200, and an L2 sync path 300.

The at least one neural core 100 may share and perform the tasks of the neural processor 1000. The number of neural cores 100 may be, for example, eight. However, various embodiments are not limited thereto. FIGS. 5 and 6 illustrate that a plurality of neural cores are included in the neural processor 1000, but various embodiments are not limited thereto. That is, the neural processor 1000 may be configured with only one neural core.

The L2 shared memory 400 may be a memory shared by the neural cores 100 in the neural processor 1000. The L2 shared memory 400 may store data of each neural core 100. In addition, the L2 shared memory 400 may receive data from the shared memory 2000 of FIG. 4, store them temporarily, and transfer them to each neural core 100. On the contrary, the L2 shared memory 400 may also receive data from the neural core 100, store them temporarily, and transfer them to the shared memory 2000 of FIG. 4.

The L2 shared memory 400 may be a memory corresponding to the neural processor level, i.e., level 2 (L2). The L3 shared memory, i.e., the shared memory 2000 may be shared by the neural processors 1000, and the L2 shared memory 400 may be shared by the neural cores 100.

The local interconnection 200 may connect the at least one neural core 100 and the L2 shared memory 400 to each other. The local interconnection 200 may be a path through which data travels between the at least one neural core 100 and the L2 shared memory 400. The local interconnection 200 may be connected and transmit data to the global interconnection 6000 of FIG. 4.

The L2 sync path 300 may connect the at least one neural core 100 and the L2 shared memory 400 to each other. The L2 sync path 300 may be a path through which synchronization signals of the at least one neural core 100 and the L2 shared memory 400 travel.

The L2 sync path 300 may be formed physically separately from the local interconnection 200. In the case of the local interconnection 200, sufficient channels may not be formed therein, unlike the global interconnection 6000. In such a case, the L2 sync path 300 may be formed separately so that the synchronization signal can be transmitted quickly and without any delay. The L2 sync path 300 may be used for synchronization performed at a level one step lower than that of the L3 sync channel 6300 of the global interconnection 6000.

Figure 7:
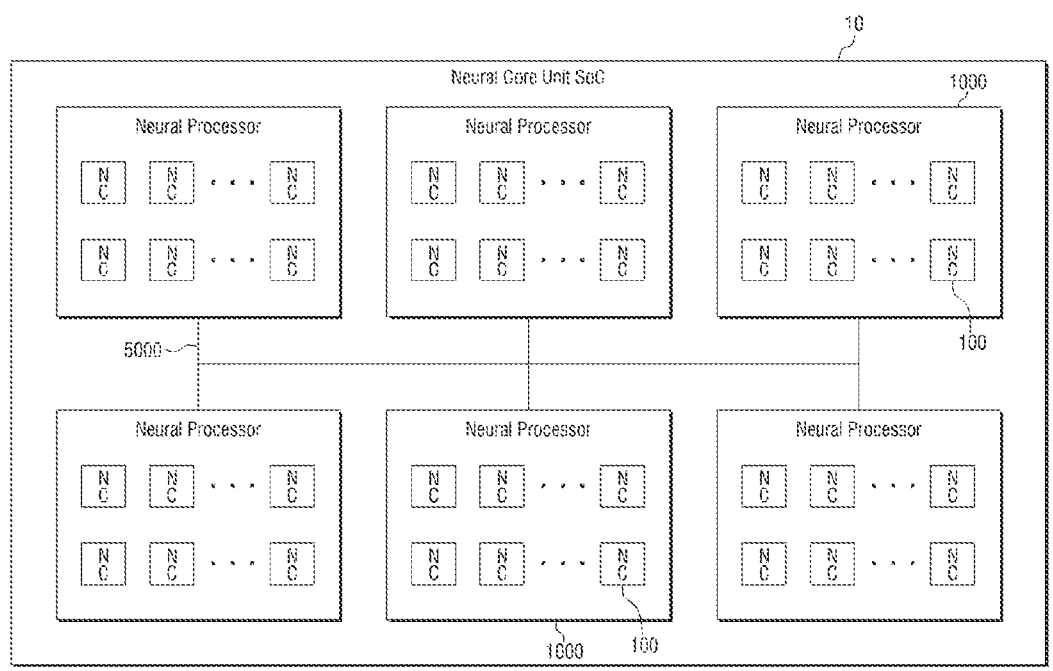
FIG. 7 is a diagram showing a hierarchical structure of a neural processing device in accordance with some embodiments.

FIG. 7 is a diagram showing a hierarchical structure of a neural processing device in accordance with some embodiments.

Referring to FIG. 7, the neural core SoC 10 may include at least one neural processor 1000. Each neural processor 1000 may transmit data to each other via the global interconnection 6000.

The neural processors 1000 may each include at least one neural core 100. The neural core 100 may be a processing unit optimized for deep learning calculation tasks. The neural core 100 may be a processing unit corresponding to one operation of a deep learning calculation task. In other words, a deep learning calculation task can be represented by a sequential or parallel combination of multiple operations. The neural cores 100 may each be a processing unit capable of processing one operation, and may be a minimum calculation unit that can be considered for scheduling from the viewpoint of a compiler.

The neural processing device in accordance with the embodiment may configure the scales of the minimum calculation unit, considered from the viewpoint of compiler scheduling and the hardware processing unit to be the same, so that fast and efficient scheduling and calculation tasks can be performed.

That is, if the processing units into which hardware can be divided are too large compared to calculation tasks, inefficiency of the calculation tasks may occur in driving the processing units. Conversely, it is not appropriate to schedule a processing unit that is a unit smaller than an operation, which is the minimum scheduling unit of the compiler, every time since a scheduling inefficiency may occur and hardware design costs may increase.

Therefore, by adjusting the scales of the scheduling unit of the compiler and the hardware processing unit to be similar in the embodiment, it is possible to simultaneously satisfy the rapid scheduling and efficient execution of calculation tasks without wasting hardware resources.

Figure 8:
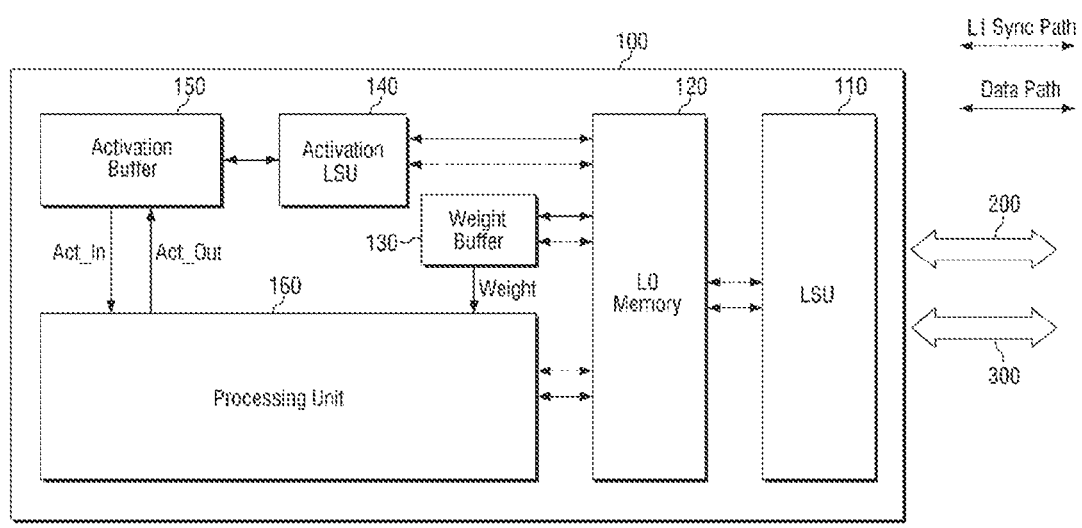
FIG. 8 is a block diagram showing a neural core in accordance with FIG. 6 in further detail.

FIG. 8 is a block diagram showing a neural core in accordance with FIG. 6 in further detail.

Referring to FIG. 8, the neural core 100 may include a load/store unit (LSU) 110, an L0 memory 120, a weight buffer 130, an activation LSU 140, an activation buffer 150, and a processing unit 160.

The LSU 110 may receive at least one of data, a control signal, or a synchronization signal from the outside via the local interconnection 200 and the L2 sync path 300. The LSU 110 may transmit at least one of the data, the control signal, or the synchronization signal received to the L0 memory 120. Similarly, the LSU 110 may transfer at least one of the data, the control signal, or the synchronization signal to the outside via the local interconnection 200 and the L2 sync path 300.

Figure 9:
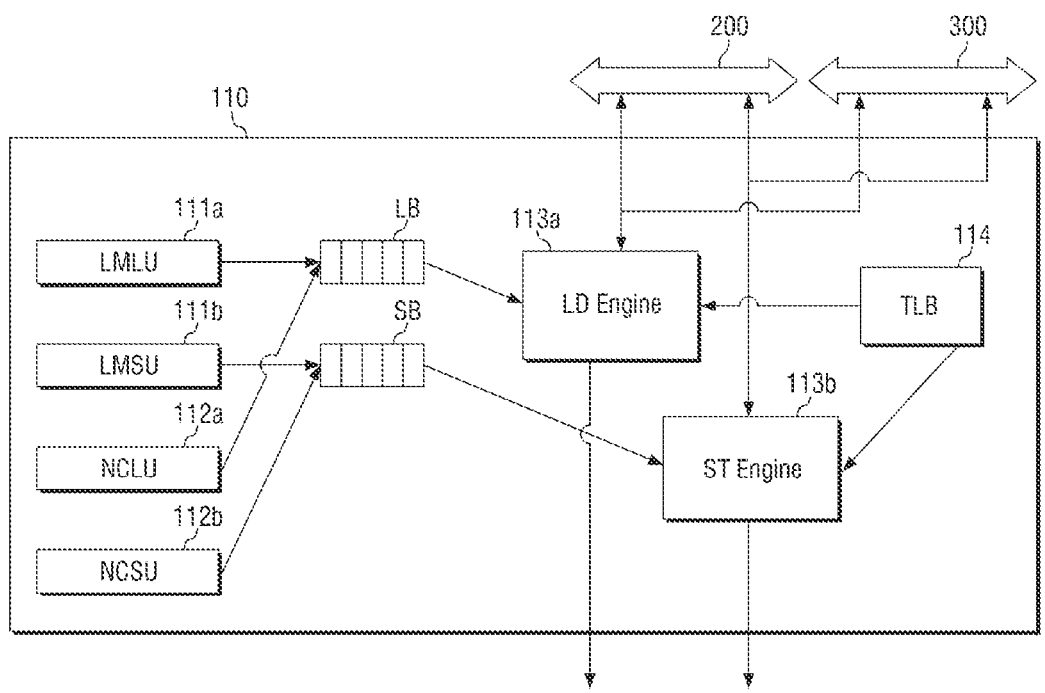
FIG. 9 is a block diagram showing a LSU in accordance with FIG. 8 in further detail.

FIG. 9 is a block diagram for illustrating the LSU of FIG. 8.

Referring to FIG. 9, the LSU 110 may include a local memory load unit (LMLU) 111a, a local memory store unit (LMSU) 111b, a neural core load unit (NCLU) 112a, a neural core store unit (NCSU) 112b, a load buffer LB, a store buffer SB, a load (LD) engine 113a, a store (ST) engine 113b, and a translation lookaside buffer (TLB) 114.

The local memory load unit 111a may fetch a load instruction for the L0 memory 120 and issue the load instruction. When the local memory load unit 111a provides the issued load instruction to the load buffer LB, the load buffer LB may sequentially transmit memory access requests to the load engine 113a according to the inputted order.

Further, the local memory store unit 111b may fetch a store instruction for the L0 memory 120 and issue the store instruction. When the local memory store unit 111b provides the issued store instruction to the store buffer SB, the store buffer SB may sequentially transmit memory access requests to the store engine 113b according to the inputted order.

The neural core load unit 112a may fetch a load instruction for the neural core 100 and issue the load instruction. When the neural core load unit 112a provides the issued load instruction to the load buffer LB, the load buffer LB may sequentially transmit memory access requests to the load engine 113a according to the inputted order.

In addition, the neural core store unit 112b may fetch a store instruction for the neural core 100 and issue the store instruction. When the neural core store unit 112b provides the issued store instruction to the store buffer SB, the store buffer SB may sequentially transmit memory access requests to the store engine 113b according to the inputted order.

The load engine 113a may receive the memory access request and retrieve data via the local interconnection 200. At this time, the load engine 113a may quickly find the data by using a translation table of a physical address and a virtual address that has been used recently in the translation lookaside buffer 114. If the virtual address of the load engine 113a is not in the translation lookaside buffer 114, the address translation information may be found in another memory.

The store engine 113b may receive the memory access request and retrieve data via the local interconnection 200. At this time, the store engine 113b may quickly find the data by using a translation table of a physical address and a virtual address that has been used recently in the translation lookaside buffer 114. If the virtual address of the store engine 113b is not in the translation lookaside buffer 114, the address translation information may be found in another memory.

The load engine 113a and the store engine 113b may send synchronization signals to the L2 sync path 300. At this time, the synchronization signal may indicate that the task has been completed.

Referring to FIG. 8 again, the L0 memory 120 is a memory located inside the neural core 100, and may receive all input data required for the tasks by the neural core 100 from the outside and store them temporarily. In addition, the L0 memory 120 may temporarily store the output data calculated by the neural core 100 for transmission to the outside. The L0 memory 120 may serve as a cache memory of the neural core 100.

The L0 memory 120 may transmit an input activation Act_In to the activation buffer 150 and receive an output activation Act_Out via the activation LSU 140. The L0 memory 120 may directly transmit and receive data to and from the processing unit 160, in addition to the activation LSU 140. In other words, the L0 memory 120 may exchange data with each of a PE array 163 and a vector unit 164.

The L0 memory 120 may be a memory corresponding to the level of the neural core. In this case, the L0 memory 120 may be a private memory of the neural core that is not shared, unlike the L2 shared memory 400 and the shared memory 2000.

The L0 memory 120 may transmit data such as activations or weights via a data path. The L0 memory 120 may exchange synchronization signals via an L1 sync path, which is a separate dedicated path. The L0 memory 120 may exchange synchronization signals with, for example, the LSU 110, the weight buffer 130, the activation LSU 140, and the processing unit 160 via the L1 sync path.

The weight buffer 130 may receive a weight from the L0 memory 120. The weight buffer 130 may transfer the weight to the processing unit 160. The weight buffer 130 may temporarily store the weight before transferring it.

The input activation Act_In and the output activation Act_Out may refer to input values and output values of the layers of a neural network. In this case, if there are a plurality of layers in the neural network, the output value of the previous layer becomes the input value of the next layer, and thus, the output activation Act_Out of the previous layer may be utilized as the input activation Act_In of the next layer.

The weight may refer to a parameter that is multiplied by the input activation Act_In inputted in each layer. The weight is adjusted and confirmed in the deep learning training phase, and may be used to derive the output activation Act_Out via a fixed value in the inference phase.

The activation LSU 140 may transfer the input activation Act_In from the L0 memory 120 to the activation buffer 150, and the output activation Act_Out from the activation buffer 150 to the on-chip buffer. In other words, the activation LSU 140 may perform both a load task and a store task of the activation.

The activation buffer 150 may provide the input activation Act_In to the processing unit 160 and receive the output activation Act_Out from the processing unit 160. The activation buffer 150 may temporarily store the input activation Act_In and the output activation Act_Out.

The activation buffer 150 may quickly provide the activation to the processing unit 160, in particular, the PE array 163, which has a large quantity of calculations, and may quickly receive the activation, thereby increasing the calculation speed of the neural core 100.

The processing unit 160 may be a module that performs calculations. The processing unit 160 may perform not only one-dimensional calculations but also two-dimensional matrix calculations, i.e., convolution operations. The processing unit 160 may receive an input activation Actin, multiply it by a weight, and then add it to generate an output activation Act_Out.

Figure 10:
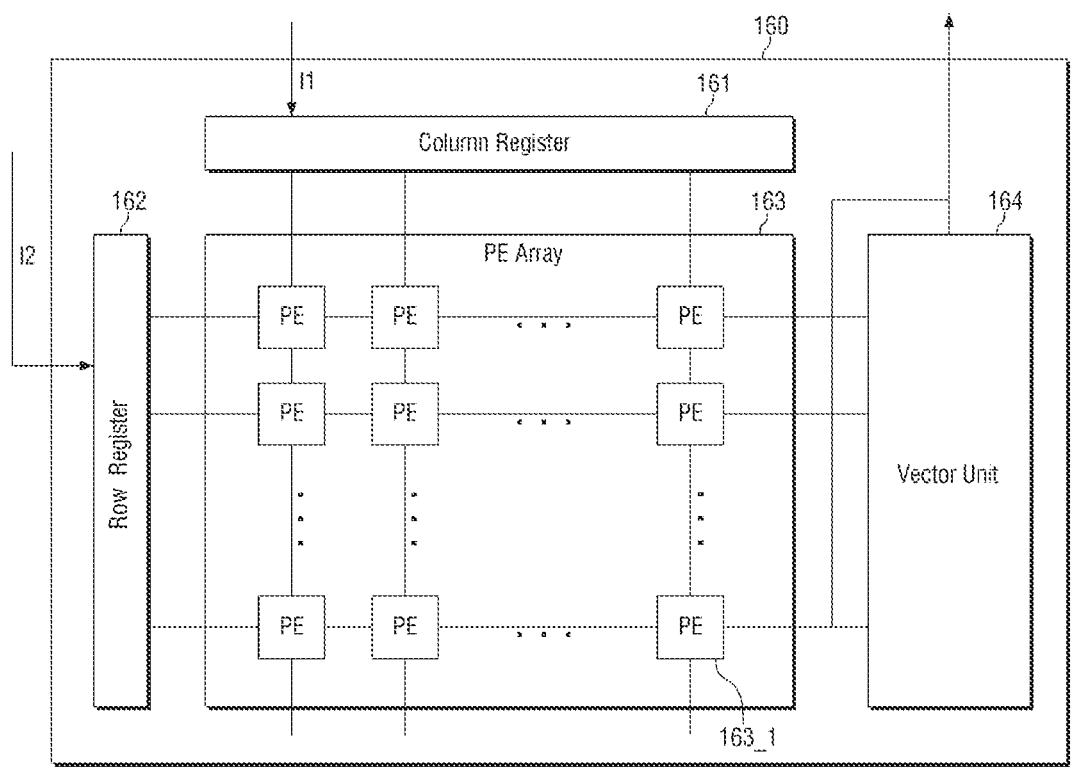
FIG. 10 is a block diagram showing a processing unit in accordance with FIG. 8.

FIG. 10 is a block diagram for illustrating the processing unit of FIG. 8 in detail.

Referring to FIG. 8 and FIG. 10, the processing unit 160 may include a PE array 163, a vector unit 164, a column register 161, and a row register 162.

The PE array 163 may receive the input activation Act_In and the weight and perform multiplication on them. In this case, each of the input activation Act_In and the weight may be in the form of matrices and calculated via convolution. Through this, the PE array 163 may generate an output activation Act_Out. However, the embodiment is not limited thereto. The PE array 163 may generate any types of outputs other than the output activation Act_Out as well.

The PE array 163 may include at least one processing element PE. The processing elements PE may be aligned with each other so that each of the processing elements PE may perform multiplication on one input activation Act_In and one weight.

The PE array 163 may sum values for each multiplication to generate a subtotal. This subtotal may be utilized as an output activation Act_Out. The PE array 163 performs two-dimensional matrix multiplication, and thus, may be referred to as a 2D matrix compute unit.

The vector unit 164 may mainly perform one-dimensional calculations. The vector unit 164, together with the PE array 163, may perform deep learning calculations. Through this, the processing unit 160 may be specialized for necessary calculations. In other words, each of the at least one neural core 100 has calculation modules that perform a large amount of two-dimensional matrix multiplications and one-dimensional calculations, and thus, can efficiently perform deep learning tasks.

The column register 161 may receive a first input I1. The column register 161 may receive the first input I1, and distribute them to each column of the processing elements PE.

The row register 162 may receive a second input I2. The row register 162 may receive the second input I2, and distribute them to each row of the processing elements PE.

The first input I1 may be an input activation Act_In or a weight. The second input I2 may be a value other than the first input I1 between the input activation Act_In or the weight. Alternatively, the first input I1 and the second input I2 may be values other than the input activation Act_In and the weight.

Figure 11:
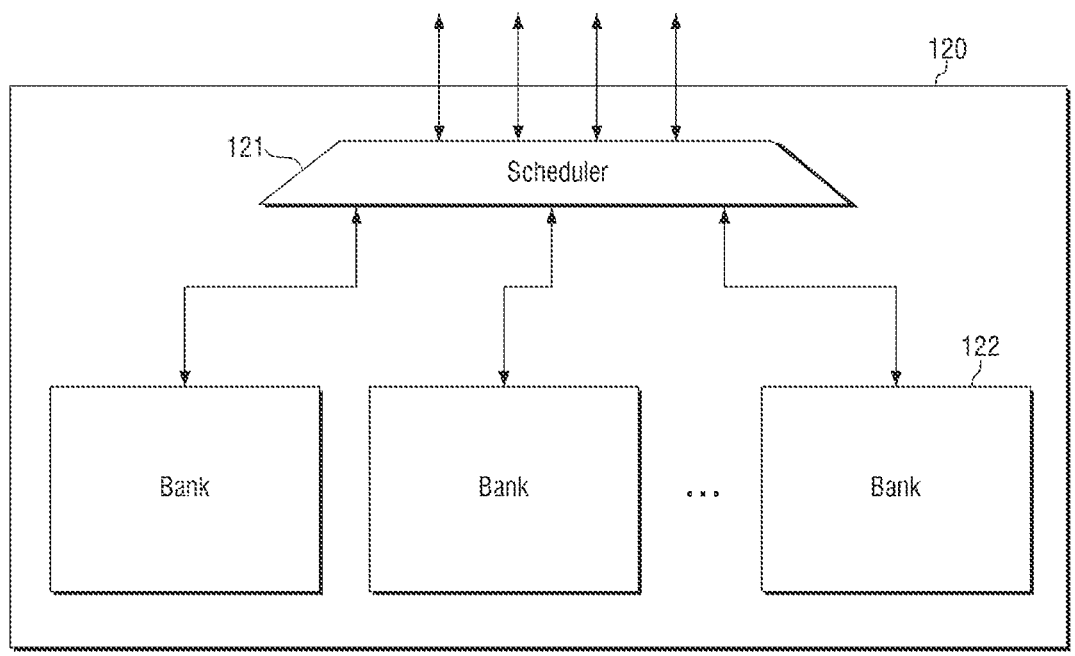
FIG. 11 is a block diagram showing a L0 memory in accordance with FIG. 8 in further detail.

FIG. 11 is a block diagram showing a L0 memory in accordance with FIG. 8 in further detail.

Referring to FIG. 11, the L0 memory 120 may include a scheduler 121 and one or more local memory banks 122.

When data is stored in the L0 memory 120, the scheduler 121 may receive data from the load engine 113a. In this case, the local memory bank 122 may be allocated for the data in a round-robin manner. Accordingly, data may be stored in any one of the local memory banks 122.

In contrast to this, when data is loaded from the L0 memory 120, the scheduler 121 may receive the data from the local memory bank 122 and transmit the data to the store engine 113b. The store engine 113b may store the data in the outside through the local interconnection 200.

Figure 12:
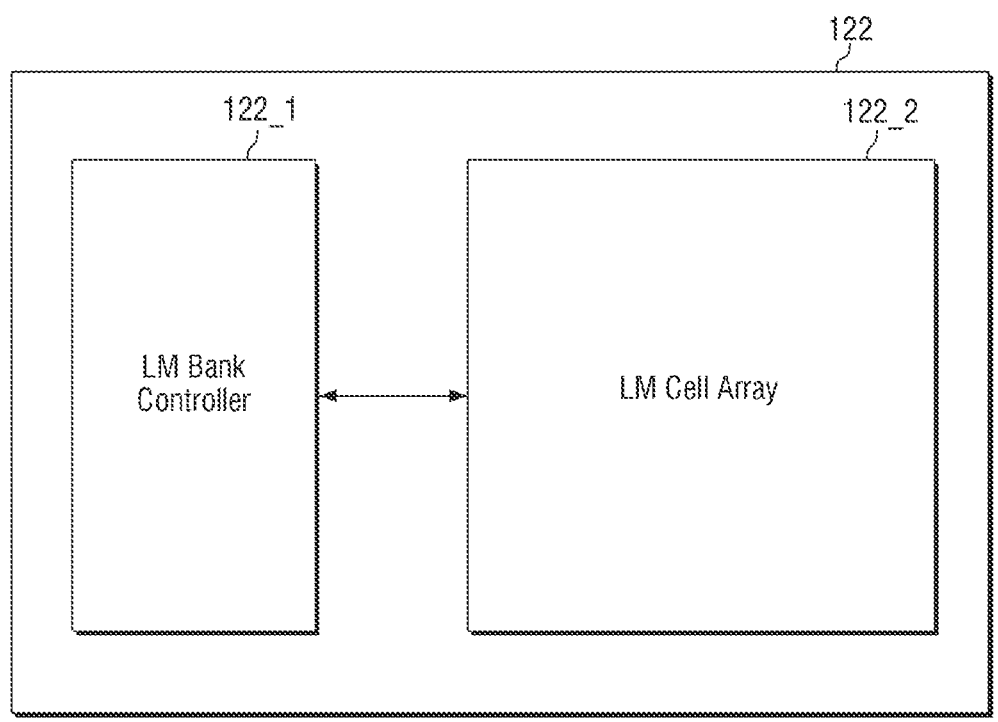
FIG. 12 is a block diagram showing a local memory bank in accordance with FIG. 11.

FIG. 12 is a block diagram showing a local memory bank in accordance with FIG. 11 in further detail.

Referring to FIG. 12, the local memory bank 122 may include a local memory bank controller 122_1 and a local memory bank cell array 122_2.

The local memory bank controller 122_1 may manage read and write operations via the addresses of data stored in the local memory bank 122. In other words, the local memory bank controller 122_1 may manage the input/output of data as a whole.

The local memory bank cell array 122_2 may be of a structure in which cells in which data is directly stored are arranged in rows and columns. The local memory bank cell array 122_2 may be controlled by the local memory bank controller 122_1.

Figure 13:
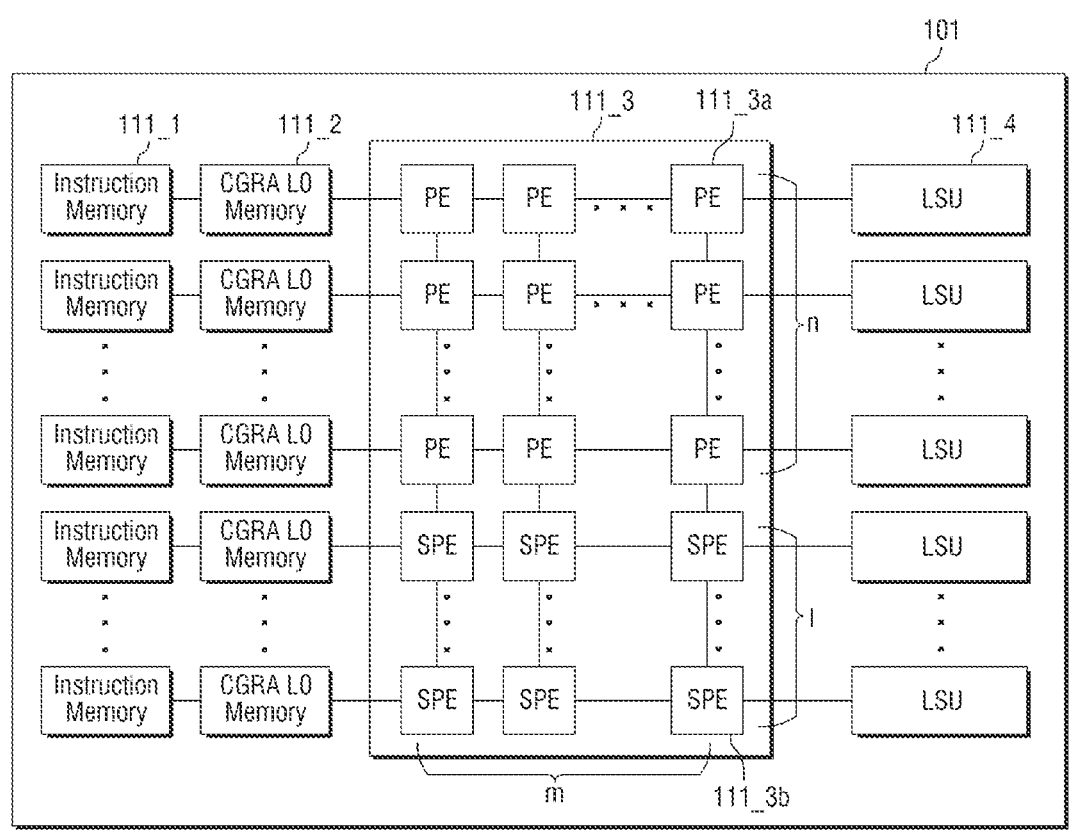
FIG. 13 is a block diagram showing a structure of a neural processing device in accordance with FIG. 2 in further detail.

FIG. 13 is a block diagram showing a structure of a neural processing device in accordance with some embodiments.

Referring to FIG. 13, the neural core 101 may be of a CGRA structure, unlike the neural core 100. The neural core 101 may include an instruction memory 111_1, a CGRA L0 memory 111_2, a PE array 111_3, and a load/store unit (LSU) 111_4.

The instruction memory 111_1 may receive and store instructions. The instruction memory 111_1 may sequentially store instructions internally, and provide the stored instructions to the PE array 111_3. In this case, the instructions may include instructing the operation of the processing element 111_3a included in each PE array 111_3.

The CGRA L0 memory 111_2 is a memory located inside the neural core 101, and may receive all the input data required for the tasks by the neural core 101 from the outside and temporarily store them. Further, the CGRA L0 memory 111_2 may temporarily store the output data calculated by the neural core 101 in order to transmit them to the outside. The CGRA L0 memory 111_2 may serve as a cache memory of the neural core 101.

The CGRA L0 memory 111_2 may send and receive data to and from the PE array 111_3. The CGRA L0 memory 111_2 may be a memory corresponding to L0 (level 0) that is lower than L1. In this case, the CGRA L0 memory 111_2 may be a private memory of the neural core 101 that is not shared, unlike the L1 shared memory 400 or the L2 shared memory i.e., the shared memory 2000. The CGRA L0 memory 111_2 may transmit data such as activations or weights, programs, and the like to the PE array 111_3.

The PE array 111_3 may be a module that performs calculations. The PE array 111_3 may perform not only one-dimensional calculations but also two-dimensional or higher matrix/tensor calculations. The PE array 111_3 may include a plurality of processing elements 111_3a and particular processing elements 111_3b therein.

The processing elements 111_3a and the particular processing elements 111_3b may be arranged in rows and columns. The processing elements 111_3a and the particular processing elements 111_3b may be arranged in m columns. Further, the processing elements 111_3a may be arranged in n rows, and the particular processing elements 111_3b may be arranged in l rows. Accordingly, the processing elements 111_3a and the particular processing elements 111_3b may be arranged in (n+l) rows and m columns.

The LSU 111_4 may receive at least one of data, a control signal, or a synchronization signal from the outside via the L1 interconnection 130. The LSU 111_4 may transmit at least one of the received data, control signal, or synchronization signal to the CGRA L0 memory 111_2. Similarly, the LSU 111_4 may transmit at least one of the data, control signal, or synchronization signal to the outside via the L1 interconnection.

The neural core 101 may have a CGRA (Coarse Grained Reconfigurable Architecture) structure. Accordingly, in the neural core 101, the respective processing elements 111_3a and particular processing elements 111_3b of the PE array 111_3 may be connected to at least one of the CGRA L0 memory 111_2, the instruction memory 111_1, or the LSU 111_4, respectively. In other words, the processing elements 111_3a and the particular processing elements 111_3b do not have to be connected to all of the CGRA L0 memory 111_2, the instruction memory 111_1, and the LSU 111_4, but may be connected to some of them.

Further, the processing elements 111_3a and the particular processing elements 111_3b may be different types of processing elements from each other. Accordingly, out of the CGRA L0 memory 111_2, the instruction memory 111_1, and the LSU 111_4, the elements connected to the processing elements 111_3a and the elements connected to the particular processing elements 111_3b may be different from each other.

The neural core 101 according to the disclosure having a CGRA structure enables high-level parallel calculations, and since direct data exchange between the processing elements 111_3a and the particular processing elements 111_3b is possible, the power consumption may be low. In addition, by including two or more types of processing elements 111_3a, optimization according to various calculation tasks may also be possible.

For example, if the processing elements 111_3a are processing elements that perform two-dimensional calculations, the particular processing elements 111_3b may be processing elements that perform one-dimensional calculations. However, the embodiment is not limited thereto.

Figure 14:
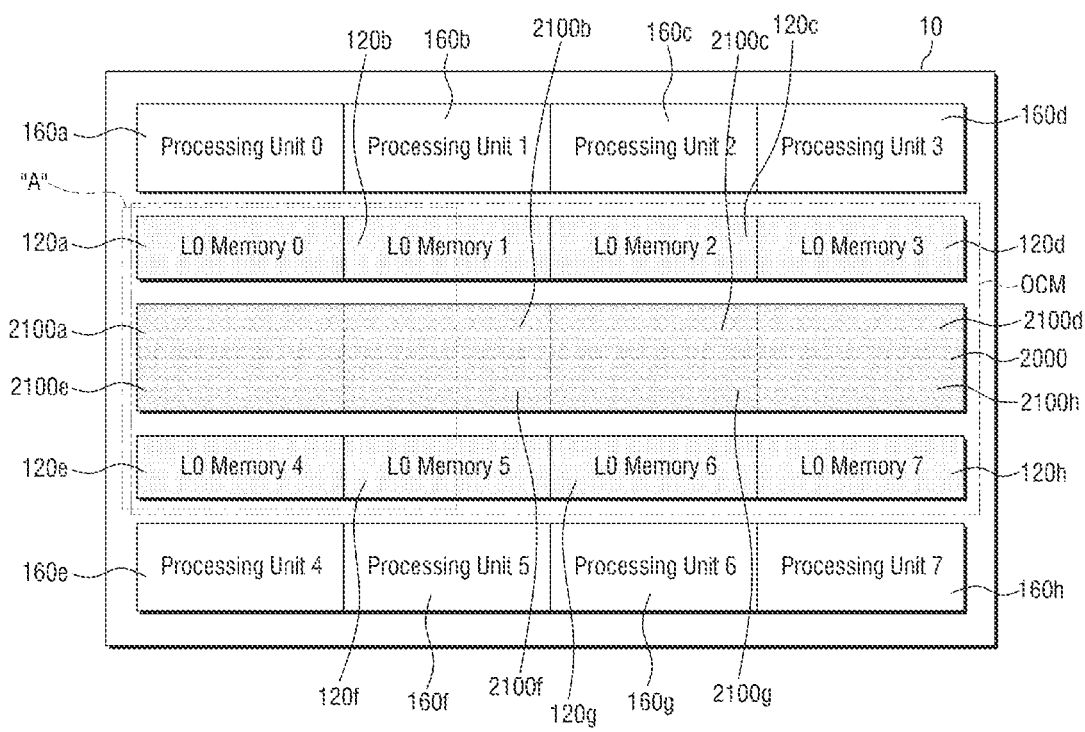
FIG. 14 is a block diagram showing a memory reconstruction of a neural processing system in accordance with FIG. 2.

FIG. 14 is a block diagram showing memory reconfiguration of a neural processing system in accordance with some embodiments.

Referring to FIG. 14, the neural core SoC 10 may include first to eighth processing units 160a to 160h and an on-chip memory OCM. Although FIG. 14 illustrates eight processing units as an example, this is merely illustrative, and the number of processing units may vary as desired.

The on-chip memory OCM may include first to eighth L0 memories 120a to 120h and a shared memory 2000.

The first to eighth L0 memories 120a to 120h may be used as private memories for the first to eighth processing units 160a to 160h, respectively. In other words, the first to eighth processing units 160a to 160h and the first to eighth L0 memories 120a to 120h may correspond to each other 1:1.

The shared memory 2000 may include first to eighth memory units 2100a to 2100h. The first to eighth memory units 2100a to 2100h may correspond to the first to eighth processing units 160a to 160h and the first to eighth L0 memories 120a to 120h, respectively. That is, the number of memory units may be eight, which is the same as the number of processing units and L0 memories.

The shared memory 2000 may operate in one of two kinds of on-chip memory types. In other words, the shared memory 2000 may operate in one of a L0 memory type or a global memory type. In other words, the shared memory 2000 may implement two types of logical memories with one piece of hardware.

If the shared memory 2000 is implemented in the L0 memory type, the shared memory 2000 may operate as a private memory for each of the first to eighth processing units 160a to 160h, just like the first to eighth L0 memories 120a to 120h. The L0 memory can operate at a relatively higher clock speed compared with the global memory, and the shared memory 2000 may also use a relatively higher clock speed when operating in the L0 memory type.

If the shared memory 2000 is implemented in the global memory type, the shared memory 2000 may operate as a common memory used by the first processing unit 160a and the second processing unit 160b together. In this case, the shared memory 2000 may be shared not only by the first to eighth processing units 160a to 160h but also by the first to eighth L0 memories 120a to 120h.

The global memory may generally use a lower clock compared with the L0 memory, but is not limited thereto. When the shared memory 2000 operates in the global memory type, the first to eighth processing units 160a to 160h may share the shared memory 2000. In this case, the shared memory 2000 may be connected to the volatile memory 32 of FIG. 3 via the global interconnection 6000 and may also operate as a buffer for the volatile memory 32.

At least part of the shared memory 2000 may operate in the L0 memory type, and the rest may operate in the global memory type. In other words, the entire shared memory 2000 may operate in the L0 memory type, or the entire shared memory 2000 may operate in the global memory type. Alternatively, part of the shared memory 2000 may operate in the L0 memory type, and the rest may operate in the global memory type.

Figure 15:
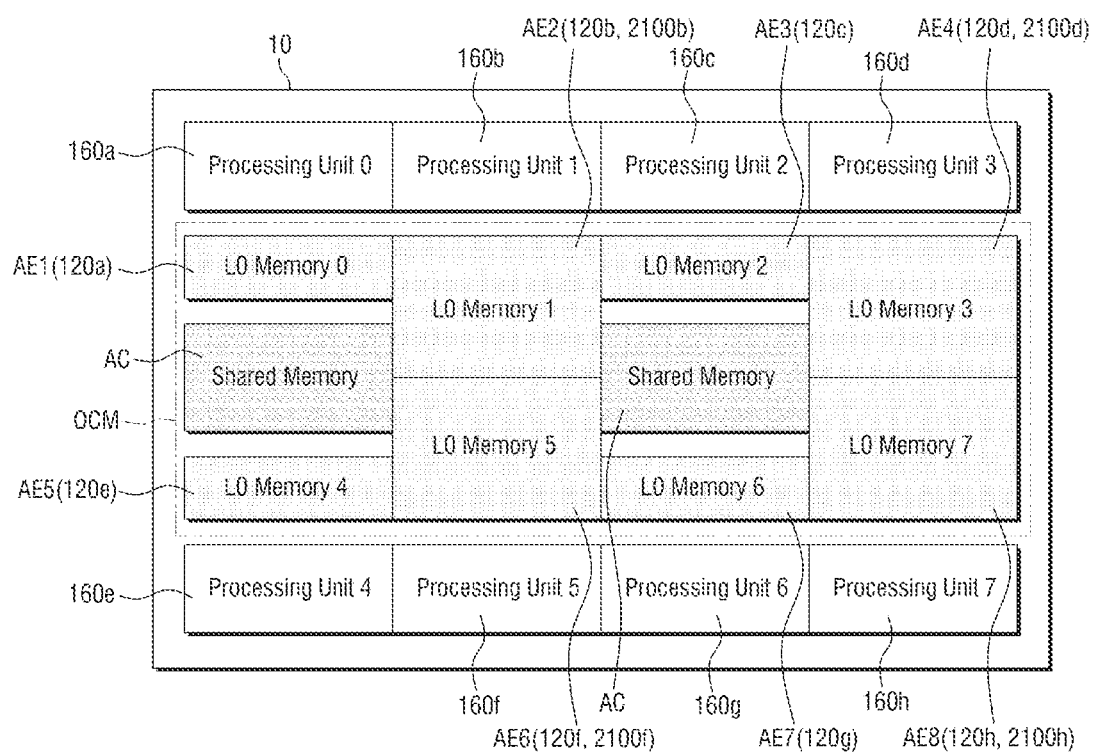
FIG. 15 is a block diagram showing an example of a memory reconstruction of a neural processing system in accordance with FIG. 2.

FIG. 15 is a block diagram showing an example of memory reconstruction of a neural processing system in accordance with some embodiments.

With reference to FIGS. 14 and 15, first, third, fifth, and seventh dedicated areas AE1, AE3, AE5, and AE7 for each of the first, third, fifth, and seventh processing units 160a, 160c, 160e, and 160g may include only the first, third, fifth, and seventh L0 memories 120a, 120c, 120e, and 120g, respectively. Further, second, fourth, sixth, and eighth dedicated areas AE2, AE4, AE6, and AE8 for each of the second, fourth, sixth, and eighth processing units 160b, 160d, 160f, and 160h may include second, fourth, sixth, and eighth L0 memories 120b, 120d, 120f, and 120h, respectively. In addition, the second, fourth, sixth, and eighth dedicated areas AE2, AE4, AE6, and AE8 may include the second, fourth, sixth, and eighth memory units 2100b, 2100d, 2100f, and 2100h. The first, third, fifth, and seventh memory units 2100a, 2100c, 2100e, and 2100g of the shared memory 2000 may be used as a common area AC.

The common area AC may be a memory shared by the first to eighth processing units 160a to 160h. The second dedicated area AE2 may include a second L0 memory 120b and a second memory unit 2100b. The second dedicated area AE2 may be an area in which the second L0 memory 120b and the second memory unit 210b that are separated hardware-wise operate in the same manner and operate logically as one L0 memory. The fourth, sixth, and eighth dedicated areas AE4, AE6, and AE8 may also operate in the same manner as the second dedicated area AE2.

The shared memory 2000 in accordance with the embodiment may convert an area corresponding to each processing unit into a logical L0 memory and a logical global memory of an optimized ratio and may use them. The shared memory 2000 may perform the adjustment of this ratio at runtime.

That is, each processing unit may perform the same task in some cases, but may perform different tasks in other cases as well. In this case, the amount of the L0 memory and the amount of the global memory required for the tasks carried out by each processing unit are inevitably different each time. Accordingly, if the composition ratio of the L0 memory and the shared memory is fixedly set as in the conventional on-chip memory, there may occur inefficiency due to the calculation tasks assigned to each processing unit.

Therefore, the shared memory 2000 of the neural processing device in accordance with the embodiment may set an optimal ratio of the L0 memory and the global memory according to calculation tasks during the runtime, and may enhance the efficiency and speed of calculation.

Figure 16:
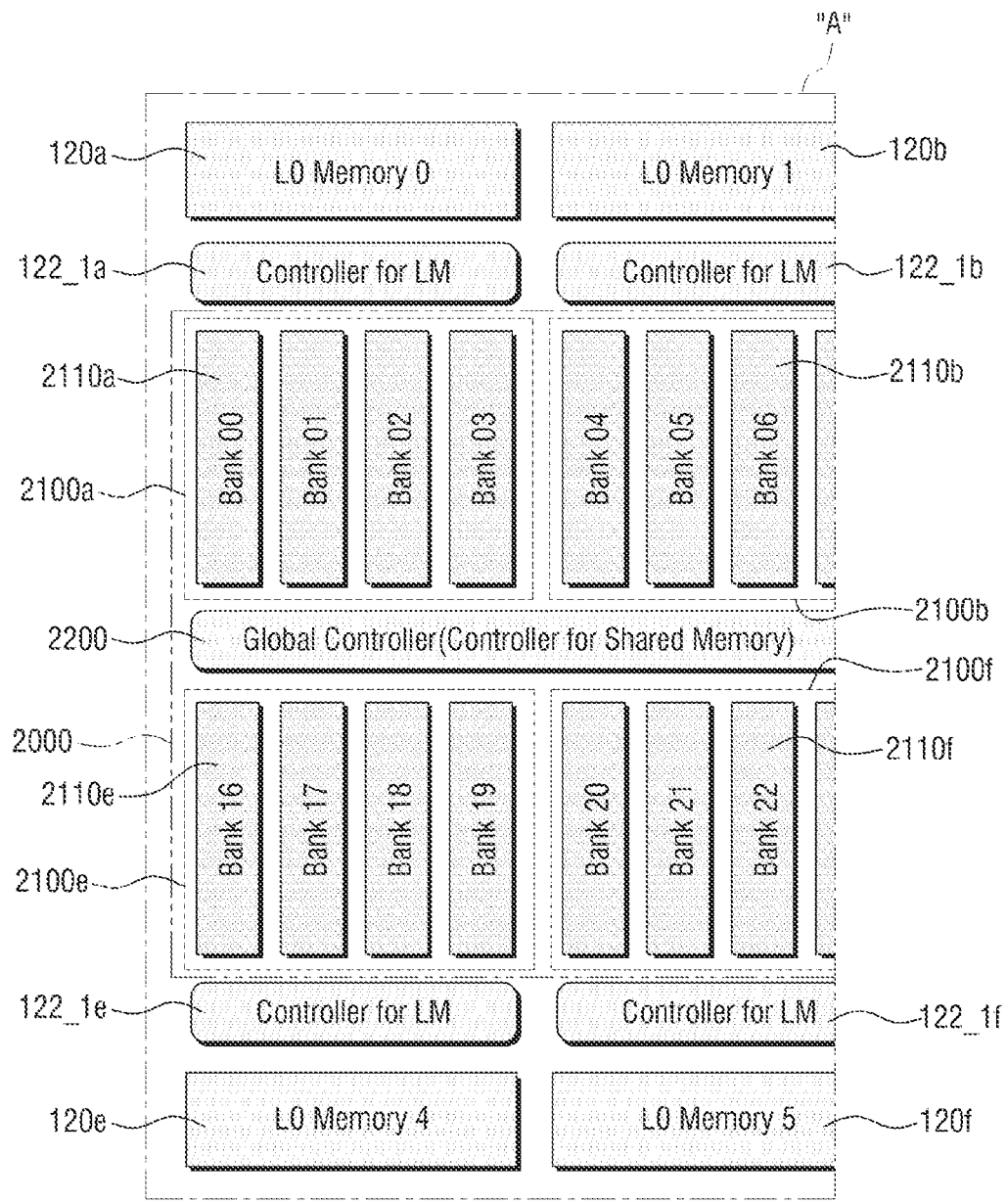
FIG. 16 is an enlarged block diagram showing a portion A in accordance with FIG. 14.

FIG. 16 is an enlarged block diagram showing a portion A in accordance with FIG. 14.

With reference to FIGS. 14 and 16, the shared memory 2000 may include a first L0 memory controller 122_1a, a second L0 memory controller 122_1b, a fifth L0 memory controller 122_1e, a sixth L0 memory controller 122_1f, the first to eighth memory units 2100a to 2100h, and a global controller 2200. Other L0 memory controllers not shown may also be included in the embodiment, but the description thereof will be omitted for convenience.

The first L0 memory controller 122_1a may control the first L0 memory 120a. In addition, the first L0 memory controller 122_1a may control the first memory unit 2100a. Specifically, when the first memory unit 2100a is implemented in a logical L0 memory type, the control by the first L0 memory controller 122_1a may be performed on the first memory unit 2100a.

The second L0 memory controller 122_1b may control the second L0 memory 120b. Further, the second L0 memory controller 122_1b may control the second memory unit 2100b. In other words, when the second memory unit 2100b is implemented in the logical L0 memory type, the control by the first L0 memory controller 122_1a may be performed on the second memory unit 2100b.

The fifth L0 memory controller 122_1e may control the fifth L0 memory 120e. Further, the fifth L0 memory controller 122_1e may control the fifth memory unit 2100e. In other words, when the fifth memory unit 2100e is implemented in the logical L0 memory type, the control by the fifth L0 memory controller 122_1e may be performed on the fifth memory unit 2100e.

The sixth L0 memory controller 122_1f may control the sixth L0 memory 120f. Further, the sixth L0 memory controller 122_1f may control the sixth memory unit 2100f. In other words, when the sixth memory unit 2100f is implemented in the logical L0 memory type, the control by the sixth L0 memory controller 122_1f may be performed on the sixth memory unit 2100f.

The global controller 2200 may control all of the first to eighth memory units 2100a to 2100h. Specifically, the global controller 2200 may control the first memory unit 2100a to the eighth memory unit 2100h when the first to eighth memory units 2100a to 2100h each operate logically in the global memory type (i.e., when they do not operate logically in the L0 memory type).

In other words, the first to eighth memory units 2100a to 2100h may be controlled by the first to eighth L0 memory controllers 122_1a to 122_1h, respectively, or may be controlled by the global controller 2200, depending on what type of memory they are logically implemented.

If the L0 memory controllers including the first, second, fifth, and sixth L0 memory controllers 122_1a, 122_1b, 122_1e, and 122_1f control the first to eighth memory units 2100a to 2100h, respectively, the first to eighth L0 memory controllers 122_1a to 122_1h control the first to eighth memory units 2100a to 2100h in the same manner as the first to eighth L0 memories 120a to 120h, and thus, can control them as the private memory of the first to eighth processing units 160a to 160h. Accordingly, the first to eighth memory units 2100a to 2100h may operate at clock frequencies corresponding to the clock frequencies of the first to eighth processing units 160a to 160h.

The L0 memory controllers including the first L0 memory controller 122_1a, the second L0 memory controller 122_1b, the fifth L0 memory controller 122_1e, and the sixth L0 memory controller 122_1f may each include the LSU 110 of FIG. 8.

If the global controller 2200 controls at least one of the first to eighth memory units 2100a to 2100h, respectively, then the global controller 2200 may control the first to eighth memory units 2100a to 2100h as the global memory of the first to eighth processing units 160a to 160h, respectively. Accordingly, at least one of the first to eighth memory units 2100a to 2100h may operate at a clock frequency independent of the clock frequencies of the first to eighth processing units 160a to 160h, respectively. In some embodiments, if the global controller 2200 controls the i-th memory unit among the first to eighth memory units 2100a to 2100h, the global controller 2200 may control the i-th memory unit as the global memory of the i-th processing unit, and the i-th memory unit may operate at a clock frequency independent of the clock frequency of the i-th processing unit. However, the embodiment is not limited thereto.

The global controller 2200 may connect the first to eighth memory units 2100a to 2100h to the global interconnection 6000 as shown and described in accordance with FIG. 4. The first to eighth memory units 2100a to 2100h may exchange data with an off-chip memory 30 as shown and described in accordance with FIG. 3 via the control of the global controller 2200 or may respectively exchange data with the first to eighth L0 memories 120a to 120h.

Each of the first to eighth memory units 2100a to 2100h may include at least one memory bank. The first memory unit 2100a may include at least one first memory bank 2110a. The first memory banks 2110a may be one or more areas obtained by dividing the first memory unit 2100a into certain sizes. The first memory banks 2110a may all be memory devices of the same size. However, the embodiment is not limited thereto. FIG. 16 shows that four memory banks are included in one memory unit.

Similarly, the second, fifth, and sixth memory units 2100b, 2100e, and 2100f may include at least one second, fifth, and sixth memory banks 2110b, 2110e, and 2110f, respectively.

In the following, the description will be made based on the first memory banks 2110a and the fifth memory banks 2110e, which may be the same as other memory banks including the second and sixth memory banks 2110b and 2110f.

The first memory banks 2110a may each operate logically in the L0 memory type or operate logically in the global memory type. In this case, the first memory banks 2110a may operate independently of the other memory banks in the first memory unit 2100a. However, the embodiment is not limited thereto.

If each memory bank operates independently, the first memory unit 2100a may include a first area operating in the same manner as the first L0 memory 120a and a second area operating in a different manner from the first L0 memory 120a. In this case, the first area and the second area do not necessarily coexist, but any one area may take up the entire first memory unit 2100a.

Likewise, the second memory unit 2100b may include a third area operating in the same manner as the second L0 memory 120b and a fourth area operating in a different manner from the second L0 memory 120b. In this case, the third area and the fourth area do not necessarily coexist, and any one area may take up the entire first memory unit 2100a.

In this case, the ratio of the first area to the second area may be different from the ratio of the third area to the fourth area. However, the embodiment is not limited thereto. Therefore, the ratio of the first area to the second area may be the same as the ratio of the third area to the fourth area. In other words, the memory composition ratio in each memory unit may vary as desired.

In general, in the case of the conventional system-on-chip, the on-chip memory except for high-speed L0 memory was often composed of high-density, low-power SRAM. This is because SRAM has high efficiency in terms of chip area and power consumption relative to required capacity. However, with the conventional on-chip memory, the processing speed slowed down significantly as was inevitable in the case where tasks that require more data quickly than the predetermined capacity of the L0 memory, and, even when the need for the global memory is not great, there is no way to utilize the remaining global memory, resulting in inefficiency.

On the other hand, the shared memory 2000 in accordance with some embodiments may be controlled selectively by any one of the two controllers depending on the case. In the case depicted, the shared memory 2000 may be controlled not only as a whole by a determined one of the two controllers but also independently for each memory unit or each memory bank.

Through this, the shared memory 2000 in accordance with the embodiment can obtain an optimal memory composition ratio according to calculation tasks during the runtime and can perform faster and more efficient calculation tasks. In the case of a processing unit specialized in artificial intelligence, the required sizes of L0 memory and global memory may vary for each particular application. Moreover, even for the same application, the required sizes of L0 memory and global memory may vary for each layer when a deep learning network is used. In the shared memory 2000, in accordance with the embodiment, the composition ratio of the memory can be changed during runtime even when calculation steps change according to each layer, making fast and efficient deep learning tasks possible.

Figure 17:
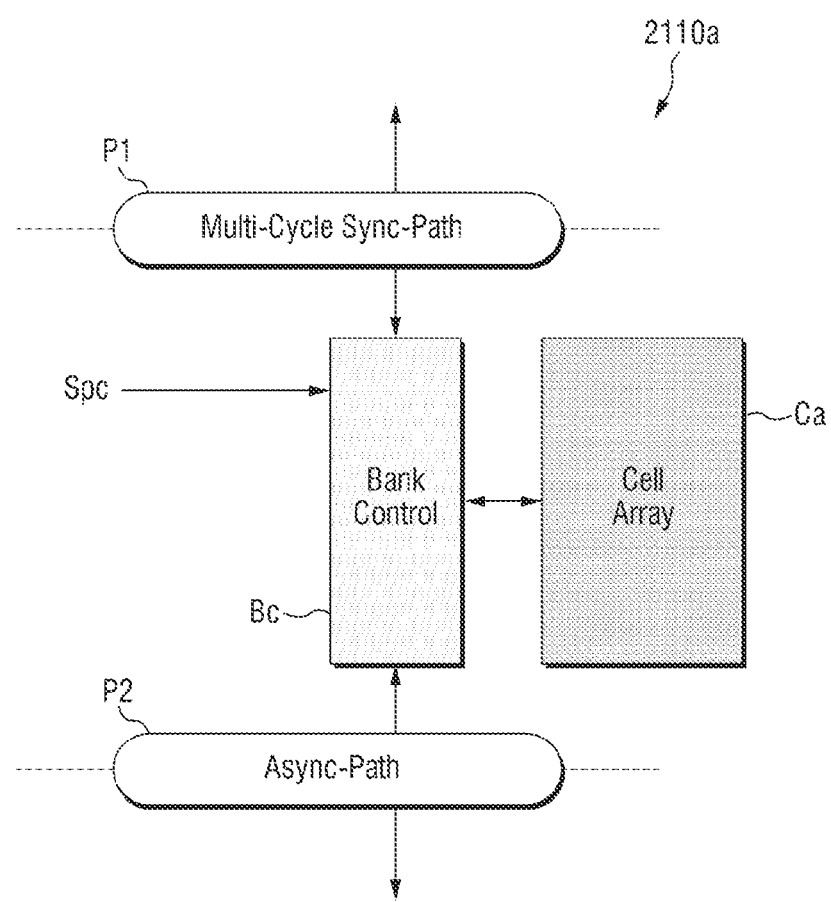
FIG. 17 is a diagram showing a first memory bank in accordance with FIG. 16 in further detail.

FIG. 17 is a diagram showing a first memory bank in accordance with FIG. 16 in further detail. Although FIG. 17 illustrates a first memory bank 2110a, other memory banks may have the same structure as the first memory bank 2110a.

Referring to FIG. 17, the first memory bank 2110a may include a cell array Ca, a bank controller Bc, a first path unit P1, and a second path unit P2.

The cell array Ca may include a plurality of memory devices (cells) therein. In the cell array Ca, the plurality of memory devices may be arranged in a lattice structure. The cell array Ca may be, for example, a SRAM (static random-access memory) cell array.

The bank controller Bc may control the cell array Ca. The bank controller Bc may determine whether the cell array Ca operates in the L0 memory type or in the global memory type, and may control the cell array Ca according to the determined memory type.

Specifically, the bank controller Bc may determine whether to transmit and receive data in the direction of the first path unit P1 or to transmit and receive data in the direction of the second path unit P2 during runtime. The bank controller Bc may determine a data transmission and reception direction according to a path control signal Spc.

The path control signal Spc may be generated by a pre-designed device driver or compiler. The path control signal Spc may be generated according to the characteristics of calculation tasks. Alternatively, the path control signal Spc may be generated by an input received from a user. In other words, the user may directly apply an input to the path control signal Spc in order to select optimal memory composition ratio.

The bank controller Bc may determine a path along which the data stored in the cell array Ca are transmitted and received via the path control signal Spc. The exchange interface of data may be changed as the bank controller Bc determines the path along which the data are transmitted and received. In other words, a first interface may be used when the bank controller Bc exchanges data with the first path unit P1, and a second interface may be used when the bank controller Bc exchanges data with the second path unit P2. In this case, the first interface and the second interface may be different from each other.

Address systems in which data are stored may vary as well. In other words, if a particular interface is selected, then read and write operations may be performed in an address system corresponding thereto.

The bank controller Bc may operate at a particular clock frequency. For example, if the cell array Ca is an SRAM cell array, the bank controller Bc may operate at the operating clock frequency of a general SRAM.

The first path unit P1 may be connected to the bank controller Bc. The first path unit P1 may directly exchange the data of the cell array Ca with the first processing unit 160a. In this case, "directly" may mean being exchanged with each other without going through the global interconnection 6000. In other words, the first processing unit 160a may exchange data directly with the first L0 memory 120a, and the first processing unit 160a may exchange data via the first path unit P1 when the shared memory 2000 is implemented logically in the L0 memory type. The first path unit P1 may include L0 memory controllers including the first L0 memory controller 122_1a and the second L0 memory controller 122_1b, as shown in FIG. 16.

The first path unit P1 may form a multi-cycle sync-path. In other words, the operating clock frequency of the first path unit P1 may be the same as the operating clock frequency of the first processing unit 160a. The first L0 memory 120a may quickly exchange data at the same clock frequency as the operating clock frequency of the first processing unit 160a in order to quickly exchange data at the same speed as the operation of the first processing unit 160a. Likewise, the first path unit P1 may also operate at the same clock frequency as the operating clock frequency of the first processing unit 160a.

In this case, the operating clock frequency of the first path unit P1 may be multiples of the operating clock frequency of the bank controller Bc. In this case, a clock domain crossing (CDC) operation for synchronizing the clocks between the bank controller Bc and the first path unit P1 is not required separately. Thus, a delay of data transmission may not occur. Accordingly, faster and more efficient data exchange can be possible.

In the embodiment shown in FIG. 17, an operating clock frequency of the first path unit P1 may be 1.5 GHz, as an example. This may be twice the frequency of 750 MHz of the bank controller Bc. However, the embodiment is not limited thereto, and any operating clock frequency of the first path unit P1 may be possible as long as the first path unit P1 operates at integer multiples of the clock frequency of the bank controller Bc.

The second path unit P2 may be connected to the bank controller Bc. The second path unit P2 may exchange the data of the cell array Ca with the first processing unit 160a not directly but via the global interconnection 6000. In other words, the first processing unit 160a may exchange data with the cell array Ca via the global interconnection 6000 and the second path unit P2. In this case, the cell array Ca may exchange data not only with the first processing unit 160a but also with other processing units.

In other words, the second path unit P2 may be a data exchange path between the cell array Ca and all the processing units when the first memory bank 2110a is implemented logically in the global memory type. The second path unit P2 may include the global controller 2200 of FIG. 16.

The second path unit P2 may form an asynchronous path or Async-Path. The operating clock frequency of the second path unit P2 may be the same as the operating clock frequency of the global interconnection 6000. Likewise, the second path unit P2 may also operate at the same clock frequency as the operating clock frequency of the global interconnection 6000.

In the case of the embodiment as shown in FIG. 16, the operating clock frequency of the second path unit P2 may not be synchronized with the operating clock frequency of the bank controller Bc. In this case, the clock domain crossing (CDC) operation for synchronizing the clocks between the bank controller Bc and the second path unit P2 may be required. If the operating clock frequency of the bank controller Bc and the operating clock frequency of the second path unit P2 are not synchronized with each other, the degree of freedom in the design of the clock domain may be relatively high. Therefore, the difficulty of hardware design is decreased, thereby making it possible to more easily derive the desired hardware operation.

The bank controller Bc may use different address systems in the case of exchanging data via the first path unit P1 and in the case of exchanging data via the second path unit P2. In other words, the bank controller Bc may use a first address system if exchanging data via the first path unit P1 and a second address system if exchanging data via the second path unit P2. In this case, the first address system and the second address system may be different from each other.

A bank controller Bc is not necessarily required for each memory bank. In other words, a bank controller Bc may not be used to schedule, but instead serves to transfer signals, and thus, is not a required component for each memory bank having two ports. Therefore, one bank controller Bc can be operably coupled to control multiple memory banks. The multiple memory banks may operate independently even if they are controlled by the bank controller Bc. However, the embodiment is not limited thereto.

As a matter of course, the bank controller Bc may exist for each memory bank. In this case, the bank controller Bc may control each memory bank individually.

Referring to FIG. 16 and FIG. 17, if the first memory unit 2100a exchanges data via the first path unit P1, the first address system may be used. If the first memory unit 2100a exchanges data via the second path unit P2, the second address system may be used. Similarly, if the second memory unit 2100b exchanges data via the first path unit P1, a third address system may be used. If the second memory unit 2100b exchanges data via the second path unit P2, the second address system may be used. In this case, the first address system and the third address system may be the same as each other. However, the embodiment is not limited thereto.

The first address system and the third address system may each be used exclusively for the first processing unit 160a and the second processing unit 160b, respectively. The second address system may be commonly applied to the first processing unit 160a and the second processing unit 160b.

In FIG. 17, the operating clock frequency of the second path unit P2 may operate at 1 GHz, as an example. This may be a frequency that is not synchronized with the operating clock frequency of 750 MHz of the bank controller Bc. In other words, the operating clock frequency of the second path unit P2 may be freely set without being dependent on the operating clock frequency of the bank controller Bc at all.

A generic global memory has used slow SRAM (e.g., 750 MHz) and a global interconnection (e.g., 1 GHz) faster than that, inevitably resulting in delays due to the CDC operation. On the other hand, the shared memory 2000 in accordance with some embodiments has room to use the first path unit P1 in addition to the second path unit P2, thereby making it possible to avoid delays resulting from the CDC operation.

Furthermore, in the generic global memory, a plurality of processing units use one global interconnection 6000, and thus, when an amount of data transfer occurs at the same time, the decrease in the overall processing speed is likely to occur. On the other hand, the shared memory 2000 in accordance with some embodiments has room to use the first path unit P1 in addition to the second path unit P2, thereby making it possible to achieve the effect of properly distributing the data throughput that could be concentrated on the global controller 2200 as well.

Figure 18:
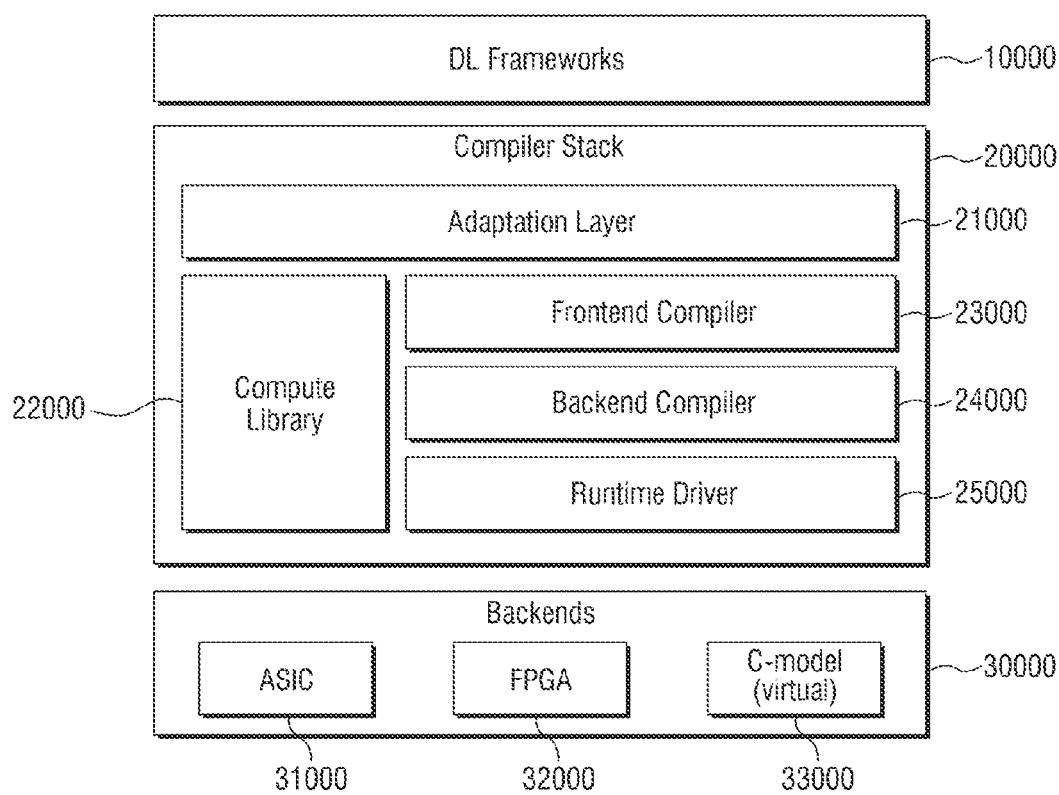
FIG. 18 is a block diagram showing a software hierarchy of a neural processing device in accordance with some embodiments.

FIG. 18 is a block diagram showing a software hierarchy of a neural processing device in accordance with some embodiments.

Referring to FIG. 18, the software hierarchy of the neural processing device in accordance with some embodiments may include a DL framework 10000, a compiler stack 20000, and a back-end module 30000.

The DL framework 10000 may mean a framework for a deep learning model network used by a user. For example, a neural network that has finished training may be generated using a program such as TensorFlow or PyTorch.

The compiler stack 20000 may include an adaptation layer 21000, a compute library 22000, a front-end compiler 23000, a back-end compiler 24000, and a runtime driver 25000.

The adaptation layer 21000 may be a layer in contact with the DL framework 10000. The adaptation layer 21000 may quantize a neural network model of a user generated by the DL framework 10000 and modify graphs. In addition, the adaptation layer 21000 may convert a type of model into a required type.

The front-end compiler 23000 may convert various neural network models and graphs transferred from the adaptation layer 21000 into a constant intermediate representation IR. The converted IR may be a preset representation that is easy to handle later by the back-end compiler 24000.

The optimization that can be done in advance in the graph level may be performed on such an IR of the front-end compiler 23000. In addition, the front-end compiler 23000 may finally generate the IR through the task of converting it into a layout optimized for hardware.

The back-end compiler 24000 optimizes the IR converted by the front-end compiler 23000 and converts it into a binary file, enabling it to be used by the runtime driver. The back-end compiler 24000 may generate an optimized code by dividing a job at a scale that fits the details of hardware.

The compute library 22000 may store template operations designed in a form suitable for hardware among various operations. The compute library 22000 provides the back-end compiler 24000 with multiple template operations required by hardware, allowing the optimized code to be generated.

The runtime driver 25000 may continuously perform monitoring during driving, thereby making it possible to drive the neural network device in accordance with some embodiments. Specifically, it may be responsible for the execution of an interface of the neural network device.

The back-end module 30000 may include an ASIC (application-specific integrated circuit) 31000, an FPGA (field-programmable gate array) 32000, and a C-model 33000. The ASIC 31000 may refer to a hardware chip determined according to a predetermined design method. The FPGA 32000 may be a programmable hardware chip. The C-model 33000 may refer to a model implemented by simulating hardware on software.

The back-end module 30000 may perform various tasks and derive results by using the binary code generated through the compiler stack 20000.

Figure 19:
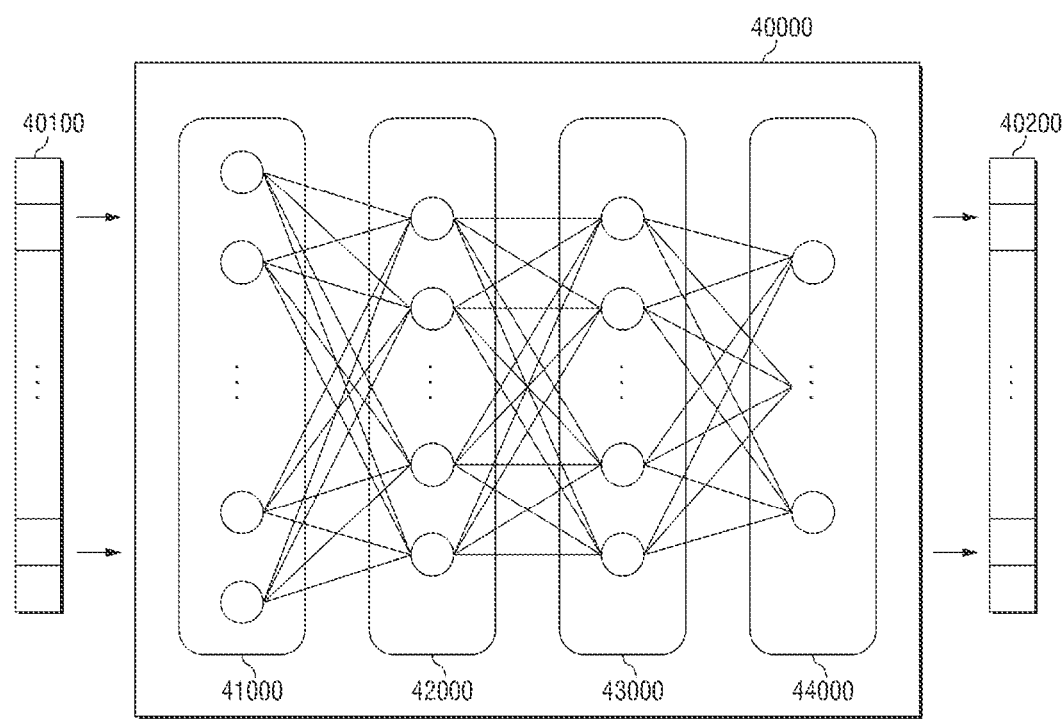
FIG. 19 is a conceptual diagram showing deep learning calculations performed by a neural processing device in accordance with some embodiments.

FIG. 19 is a conceptual diagram showing deep learning calculations performed by a neural processing device in accordance with some embodiments.

Referring to FIG. 19, an artificial neural network model 40000 is one example of a machine learning model and is a statistical learning algorithm implemented based on the structure of a biological neural network or is a structure for executing the algorithm, in machine learning technology and cognitive science.

The artificial neural network model 40000 may represent a machine learning model having an ability to solve problems by learning to reduce the error between an accurate output corresponding to a particular input and an inferred output by repeatedly adjusting the weight of the synapse by nodes. Nodes are artificial neurons that have formed a network by combining synapses, as in a biological neural network. For example, the artificial neural network model 40000 may include any probabilistic model, neural network model, etc., used in artificial intelligence learning methods such as machine learning and deep learning.

A neural processing device in accordance with some embodiments may implement the form of such an artificial neural network model 40000 and perform calculations. For example, the artificial neural network model 40000 may receive an input image and may output information on at least a part of an object included in the input image.

The artificial neural network model 40000 may be implemented by a multilayer perceptron (MLP) including multi-layer nodes and connections between them. An artificial neural network model 40000 in accordance with the embodiment may be implemented using one of various artificial neural network model structures including the MLP. As shown in FIG. 29, the artificial neural network model 40000 includes an input layer 41000 that receives input signals or data 40100 from the outside, an output layer 44000 that outputs output signals or data 40200 corresponding to the input data, and n (where n is a positive integer) hidden layers 42000 to 43000 that are located between the input layer 41000 and the output layer 44000 and that receive a signal from the input layer 41000, extract characteristics, and forward them to the output layer 44000. Here, the output layer 44000 receives signals from the hidden layers 42000 to 43000 and outputs them to the outside.

The learning methods of the artificial neural network model 40000 include a supervised learning method for training to be optimized to solve a problem by the input of supervisory signals (correct answers), and an unsupervised learning method that does not require supervisory signals.

The neural processing device may directly generate training data, through simulations, for training the artificial neural network model 40000. In this way, by matching a plurality of input variables and a plurality of output variables corresponding thereto with the input layer 41000 and the output layer 44000 of the artificial neural network model 40000, respectively, and adjusting the synaptic values between the nodes included in the input layer 41000, the hidden layers 42000 to 43000, and the output layer 44000, training may be made to enable a correct output corresponding to a particular input to be extracted. Through such a training phase, it is possible to identify the characteristics hidden in the input variables of the artificial neural network model 40000, and to adjust synaptic values (or weights) between the nodes of the artificial neural network model 40000 so that an error between an output variable calculated based on an input variable and a target output is reduced.

Figure 20:
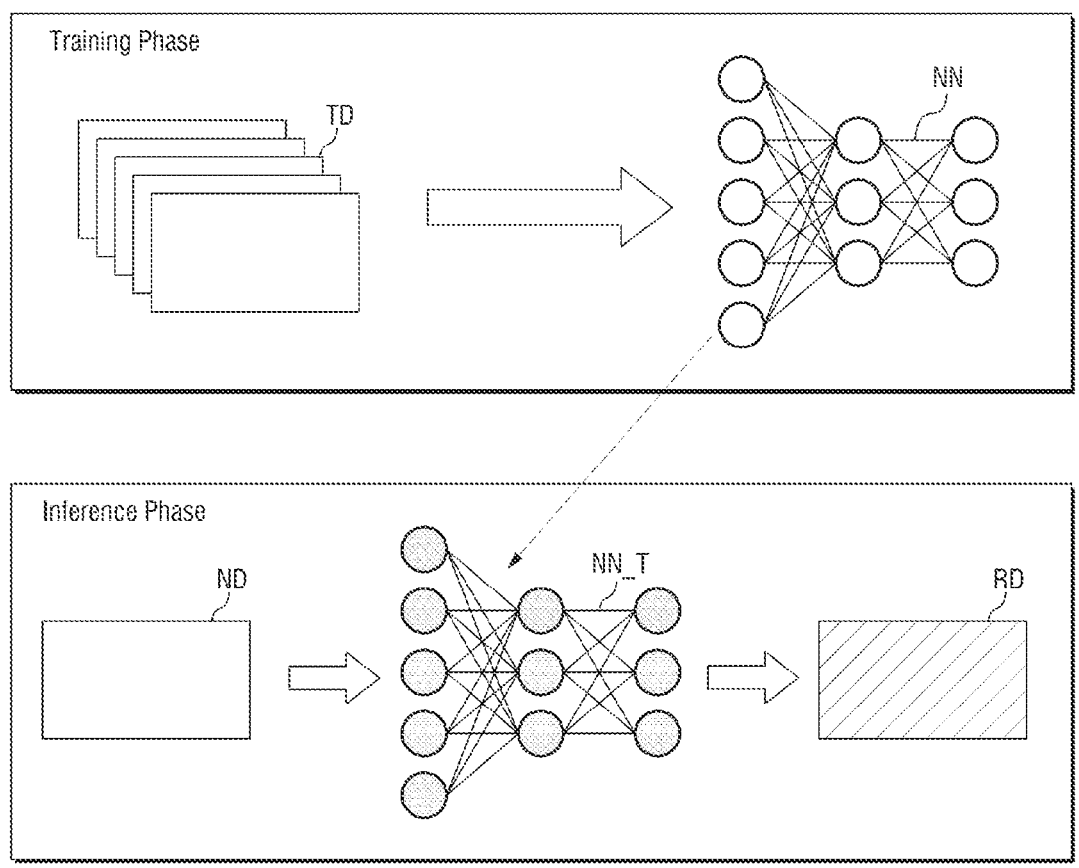
FIG. 20 is a conceptual diagram showing training and inference operations of a neural network of a neural processing device in accordance with some embodiments.

FIG. 20 is a conceptual diagram showing training and inference operations of a neural network of a neural processing device in accordance with some embodiments.

Referring to FIG. 20, the training phase may be subjected to a process in which a large number of pieces of training data TD are passed forward to the artificial neural network model NN and are passed backward again. Through this, the weights and biases of each node of the artificial neural network model NN are tuned, and training may be performed so that more and more accurate results can be derived. Through the training phase, the artificial neural network model NN may be converted into a trained neural network model NN_T.

In the inference phase, new data ND may be inputted into the trained neural network model NN_T again. The trained neural network model NN_T may derive result data RD through the weights and biases that have already been used in the training, with the new data ND as input. For such result data RD, what training data TD were used in training and how many pieces of training data TD were used in the training phase may be important.

Hereinafter, a device for measuring performance in accordance with some embodiments will be described with reference to FIGS. 21 to 36. Any description overlapping with the embodiments described above will be simplified or omitted.

FIG. 21 is a table showing hardware information in accordance with FIG. 1.

Referring to FIGS. 1 and 21, the hardware information System spec. and Design spec. may include various information. For example, the hardware information System spec. and Design spec. may include at least one of a clock frequency, a memory size, an initial latency, a total bandwidth, a maximum multiple outstanding, or a maximum bandwidth.

In this case, the clock frequency may refer to the frequency of the clock of each piece of hardware. For example, the clock frequency may include a clock frequency of a neural core and a frequency of an interconnection, respectively. Clock frequencies for each of the several cores and several interconnections of the neural processing device 1 may be included in the hardware information System spec. and Design spec.

The memory size may refer to sizes according to various memories. The initial latency may refer to an initial latency independent of bandwidths in data transfer between respective memories. That is, the data transfer between memories may slow down more quickly in its transfer rate according to the amount of data, if the bandwidth is small. The initial latency may refer to a basic latency independent of the amount of data.

The total bandwidth may refer to an overall read bandwidth and an overall write bandwidth of each memory. The hardware information System spec. and Design spec. may provide the total bandwidth according to the read and write in each memory. Alternatively, if both the read and write operations share the bandwidth according to the setting, the total bandwidth obtained by summing the read and write may be provided.

The maximum multiple outstanding may refer to the maximum number of requests that one hardware element can transmit over each interconnection. That is, if one memory can transmit requests over an interconnection indefinitely, all interconnections may be paralyzed due to a bottleneck effect. Accordingly, each interconnection can prevent the above problem by limiting the maximum number of requests.

The maximum bandwidth may refer to the bandwidths of hardware components such as load units and store units. Therefore, the maximum bandwidth is classified via interconnections, but may refer to the maximum bandwidth of each hardware component itself, as opposed to the bandwidth of the interconnection itself.

Figure 22:
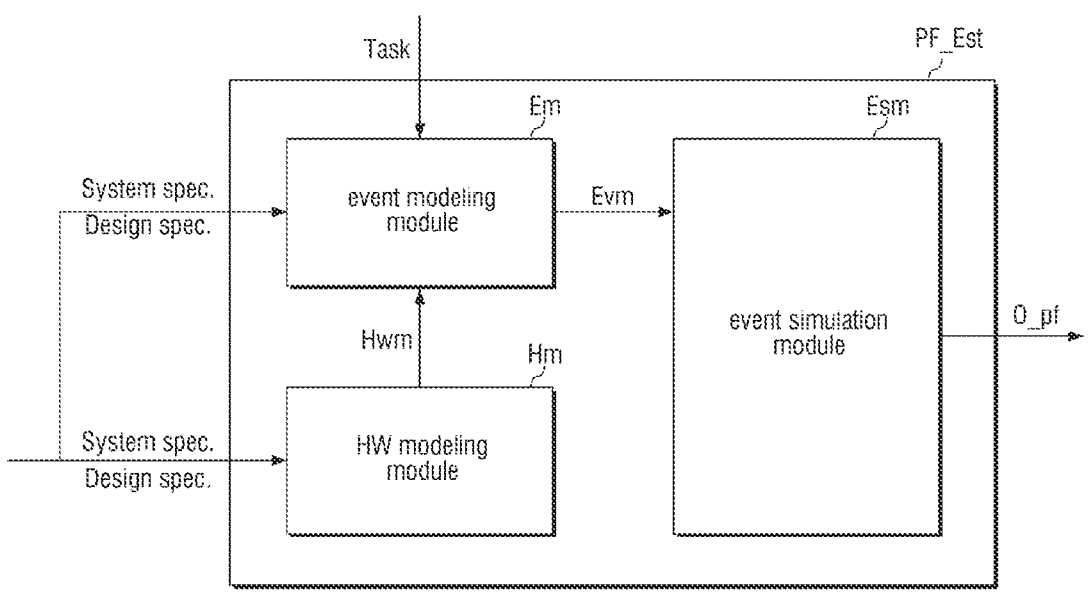
FIG. 22 is a block diagram showing a performance estimator in accordance with FIG. 1 in further detail.

FIG. 22 is a block diagram showing a performance estimator in accordance with FIG. 1 in further detail.

Referring to FIG. 22, the performance estimator PF_Est may include a hardware modeling module Hm, an event modeling module Em, and an event simulation module Esm.

The hardware modeling module Hm may receive hardware information System spec. and Design spec. and generate a hardware model Hwm. The hardware modeling module Hm may express each hardware component as an agent through the hardware information System spec. and Design spec.

Figure 23:
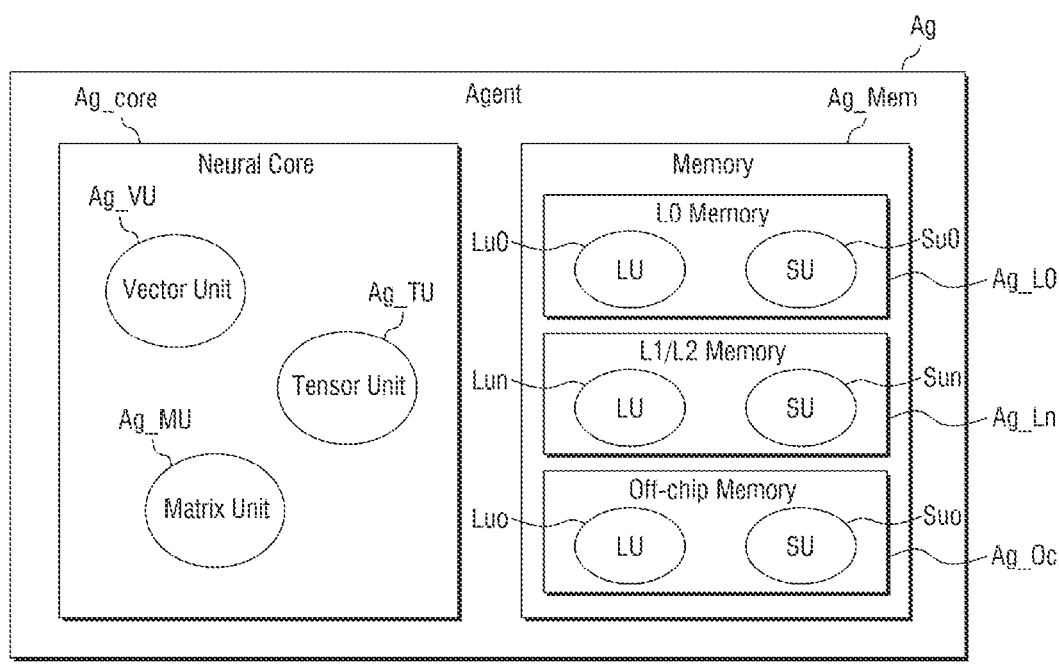
FIG. 23 is a conceptual diagram showing an agent used in a hardware model in accordance with FIG. 22.

FIG. 23 is a conceptual diagram showing an agent used in the hardware model in accordance with FIG. 22.

Referring to FIG. 23, an agent Ag may include a core agent Ag_core and a memory agent Ag_Mem. The core agent Ag_core may be created by performing abstraction on at least one processing unit. The core agent Ag_core may include, for example, at least one of a vector unit agent Ag_VU, a tensor unit agent Ag_TU, or a matrix unit agent Ag_MU.

In contrast, the memory agent Ag_Mem may include at least one of an L0 agent Ag_L0, an Ln agent Ag_Ln, or an off-chip agent Ag_Oc for each memory. The L0 agent Ag_L0 may be an agent corresponding to a memory component at an L0 level, and the Ln agent Ag_Ln may be an agent corresponding to a memory component at an L1, L2, or higher level. The off-chip agent Ag_Oc may be an agent corresponding to an off-chip memory component.

There are load units and store units that perform load and store operations into other memories in each memory, and there may exist such load units and store units in plurality for each data transfer location.

Therefore, the L0 agent Ag_L0 may include at least one L0 load unit agent Lu0 and at least one L0 store unit agent Su0. The Ln agent Ag_Ln may include at least one Ln load unit agent Lun and at least one Ln store unit agent Sun. The off-chip agent Ag_Oc may include at least one off-chip load unit agent Luo and at least one off-chip store unit agent Suo.

Referring again to FIG. 22, the hardware model Hwm may be data represented by identifying each agent Ag in the hardware information System spec. and Design spec.

The event modeling module Em may receive the hardware model Hwm and the calculation task Task. In addition, the hardware information System spec. and Design spec. may also be received. The event modeling module Em may generate an event model Evm based on the hardware model Hwm. The event model Evm can divide and generate the calculation task Task into units of events. The event model Evm may be data that intuitively express in what order and manner the calculation task Task proceeds.

Figure 24:
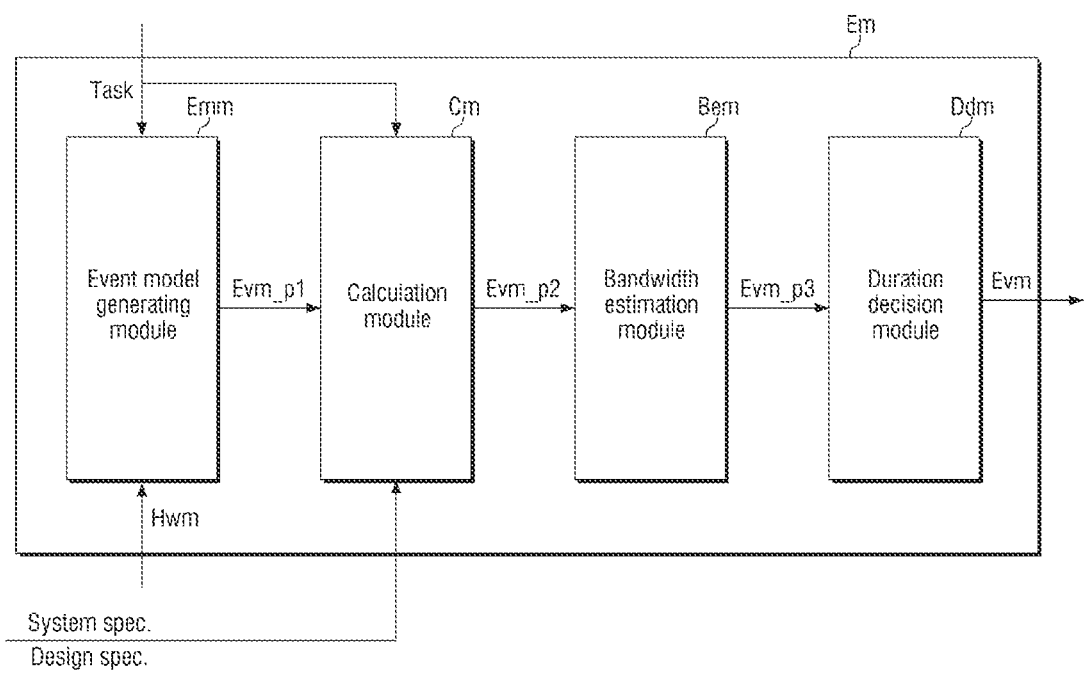
FIG. 24 is a block diagram showing an event modeling module in accordance with FIG. 22 in further detail.

FIG. 24 is a block diagram showing an event modeling module in accordance with FIG. 22 in further detail.

Referring to FIG. 24, the event modeling module Em may include an event model generating module Emm, a calculation module Cm, a bandwidth estimation module Bem, and a duration decision module Ddm.

The event model generating module Emm may receive the hardware model Hwm and the calculation task Task. The event model generating module Emm may generate a first pre-event model Evm_p1 based on the hardware model Hwm. The first pre-event model Evm_p1 may divide the calculation task Task by units of events and express them with nodes and edges.

Figure 25:
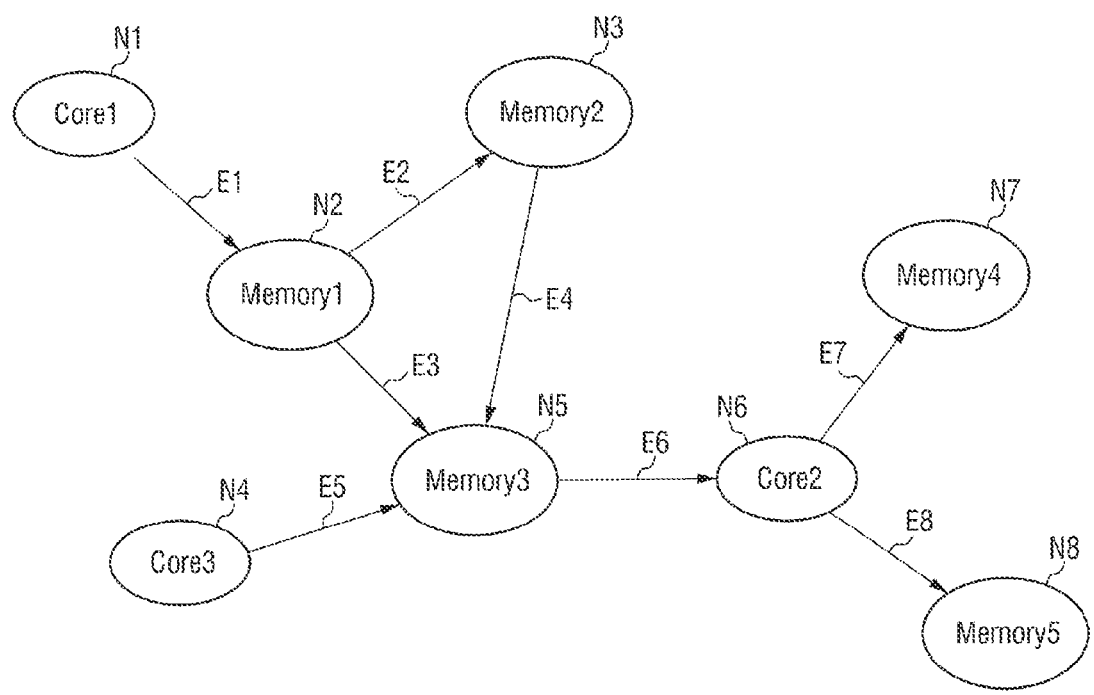
FIG. 25 is an example conceptual diagram showing an event model in accordance with some embodiments.

FIG. 25 is an example conceptual diagram showing an event model, in accordance with some embodiments.

Referring to FIG. 25, the first pre-event model Evm_p1 may set hardware agents as nodes and data transmission between the nodes as edges. In FIG. 25, first to eighth nodes N1 to N8 and first to eighth edges E1 to E8 therebetween are illustratively shown. The edges may be formed of arrows to indicate the moving direction of data.

Figure 26:
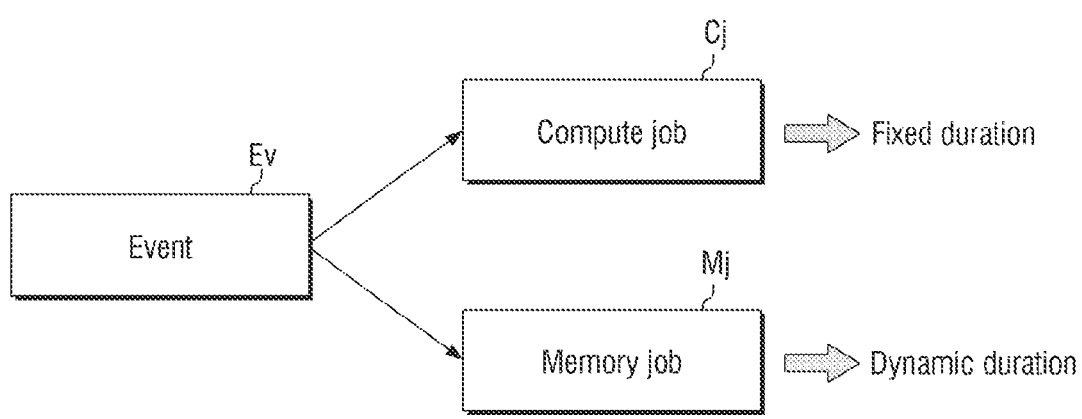
FIG. 26 is a conceptual diagram showing types of events in accordance with some embodiments.

FIG. 26 is a conceptual diagram showing types of events, in accordance with some embodiments.

Referring to FIG. 26, an event Ev included in the calculation task Task may have two types. The event Ev may include a compute job Cj and a memory job Mj. The compute job Cj may be an event in which the core agent Ag_core performs a calculation. The compute job Cj may have a fixed duration as its speed can be computed through the hardware information System spec. and Design spec.

In contrast, the memory job Mj may not be fixed in the speed at which data is transferred between memories. That is, the memory job Mj may have a dynamic duration that varies according to the formation conditions of the event Ev.

Figure 27:
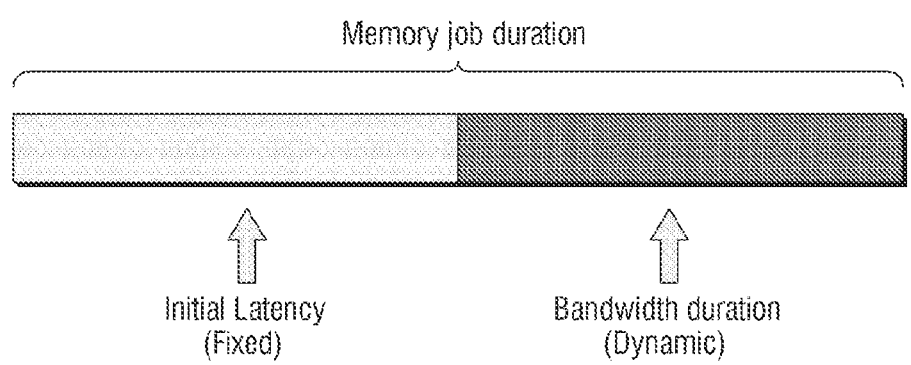
FIG. 27 is a conceptual diagram showing a memory job duration in accordance with some embodiments.

FIG. 27 is a conceptual diagram showing a memory job duration, in accordance with some embodiments.

Referring to FIG. 27, the memory job duration, i.e., the time it takes to perform the memory job Mj, may include an initial latency and a bandwidth duration.

In this case, the initial latency may be a fixed value provided by the hardware information System spec. and Design spec. The bandwidth duration may be dynamically determined according to the distribution situation of the bandwidth of each node.

Figure 28:
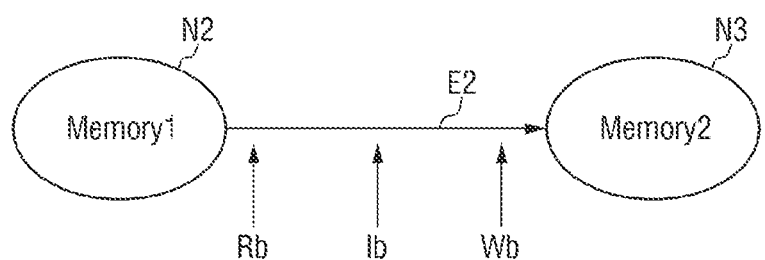
FIG. 28 is a conceptual diagram showing bounds for a bandwidth duration in accordance with some embodiments.

FIG. 28 is a conceptual diagram showing bounds for a bandwidth duration, in accordance with some embodiments.

Referring to FIG. 28, it can be shown that data are transferred between a second node Memory1 N2 and a third node Memory2 N3 via a second edge E2. Specifically, data may move from the second node N2 to the third node N3 via the second edge E2. In this case, the second edge E2 may have three bounds. The bounds may refer to limiting conditions of a bandwidth. The second edge E2 may have an individual bound Ib, a read bound Rb, and a write bound Wb.

The individual bound Ib may be a bandwidth value fixed in advance via the hardware information System spec. and Design spec. of an interconnection connecting the second node N2 and the third node N3. That is, the individual bound Ib may be determined through the hardware information System spec. and Design spec.

The read bound Rb may vary depending on the number of edges departing from the second node N2. Similarly, the write bound Wb may vary depending on the number of edges arriving at the third node N3. Therefore, what makes the bandwidth duration dynamic may be the read bound Rb and the write bound Wb.

Referring again to FIG. 24, the calculation module Cm may receive the first pre-event model Evm_p1. The first pre-event model Evm_p1 may be in a state in which the connection relationships between nodes and edges have been determined, but the final duration of each edge has not been determined. That is, each edge may have an undetermined duration. In this case, the undetermined duration may have a fixed duration determined by the hardware information and a bandwidth duration determined by the bandwidth. The undetermined duration may be converted into a final duration as the value of the undetermined duration is determined.

The first pre-event model Evm_p1 may be in a state in which fixed values among the undetermined durations, i.e., fixed durations, have also not yet been computed. The fixed duration may include the duration of the compute job Cj and the initial latency of the memory job Mj.

The calculation module Cm may receive the hardware information System spec. and Design spec. The calculation module Cm may compute the duration of the compute job Cj and the initial latency of the memory job Mj through the hardware information. Accordingly, all the values of the durations other than the bandwidth duration of each edge may be computed. As such, fixed durations may be computed in the first pre-event model Evm_p1 to thereby generate a second pre-event model Evm_p2.

The bandwidth estimation module Bem may receive the second pre-event model Evm_p2. The bandwidth estimation module Bem may estimate the bandwidth duration from the second pre-event model Evm_p2 to thereby determine a value of the undetermined duration. The value of the undetermined duration may be determined and the undetermined duration may be converted into a final duration. Accordingly, the bandwidth estimation module Bem may generate a third pre-event model Evm_p3 whose final duration is determined from the second pre-event model Evm_p2.

Figure 29A:
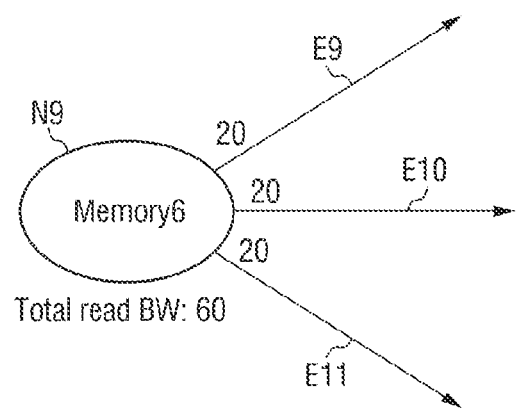
FIG. 29A is a conceptual diagram showing even distribution of a read bound of an edge in accordance with some embodiments.

FIG. 29a is a conceptual diagram showing even distribution of a read bound of an edge, according to some embodiments.

Referring to FIG. 29a, since one node corresponds to each agent, the value of the total bandwidth may be indicated in the hardware information System spec. and Design spec. In this case, if three edges, e.g., a ninth edge E9, a tenth edge E10, and an eleventh edge E11, depart from a ninth node N9, each edge may be evenly assigned the value of the total read bandwidth as the read bound Rb. Accordingly, each edge may be evenly assigned a total read bandwidth value of 60 and have 20 as a read bound Rb, respectively.

Figure 29B:
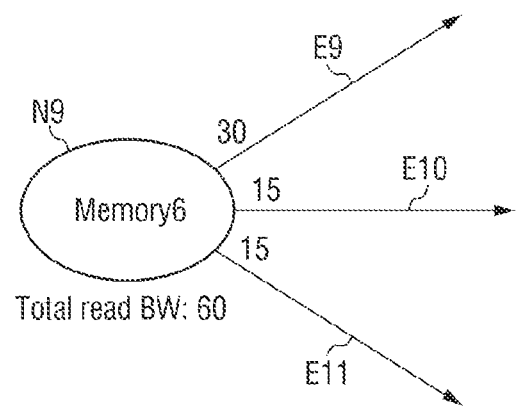
FIG. 29B is a conceptual diagram showing uneven distribution of a read bound of an edge in accordance with some embodiments.

FIG. 29b is a conceptual diagram showing uneven distribution of a read bound of an edge, in accordance with various embodiments.

Referring to FIG. 29b, the total bandwidth value of one node may be distributed unevenly. In this case, if three edges, e.g., a ninth edge E9, a tenth edge E10, and an eleventh edge E11, depart from a ninth node N9, each edge thereof may be unevenly assigned the total read bandwidth value as the read bound Rb. For example, each edge may be unevenly assigned a total read bandwidth value of 60 and have 30, 15, and 15 as read bounds Rb, respectively.

This uneven distribution may be defined by a preset operating mechanism. For example, a DRAM controller may have priorities set according to its counterparts and assign more bandwidths to edges of higher priorities.

Figure 30A:
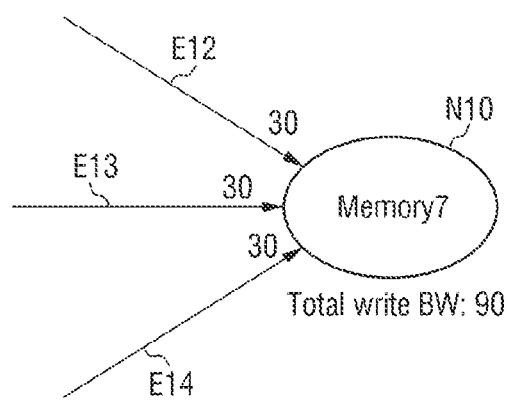
FIG. 30A is a conceptual diagram showing even distribution of a write bound of an edge in accordance with some embodiments.

FIG. 30a is a conceptual diagram showing even distribution of a write bound of an edge, in accordance with various embodiments.

Referring to FIG. 30a, if three edges, e.g., a twelfth edge E12, a thirteenth edge E13, and a fourteenth edge E14, arrive at a tenth node N10, each edge thereof may be evenly assigned the total write bandwidth value as the write bound Wb. Accordingly, each edge may be evenly assigned a total write bandwidth value of 90 and have 30 as a write bound Wb, respectively.

Figure 30B:
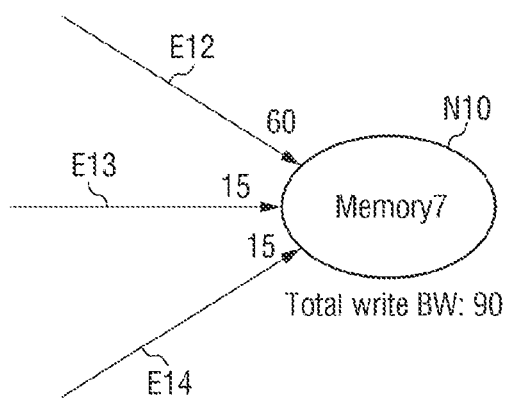
FIG. 30B is a conceptual diagram showing uneven distribution of a write bound of an edge in accordance with some embodiments.

FIG. 30b is a conceptual diagram showing uneven distribution of a write bound of an edge, in accordance with various embodiments.

Referring to FIG. 30b, if three edges, e.g., a twelfth edge E12, a thirteenth edge E13, and a fourteenth edge E14, arrive at a tenth node N10, each edge thereof may be unevenly assigned the total write bandwidth value as the write bound Wb. For example, each edge may be unevenly assigned a total write bandwidth value of 90 and have 60, 15, and 15 as write bounds Wb, respectively. This uneven distribution may be defined by a preset operating mechanism.

Figure 31:
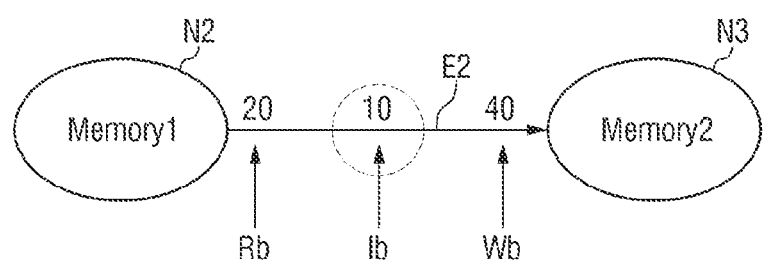
FIG. 31 is an example diagram showing conditions for determining a final bandwidth of an edge in accordance with some embodiments.

FIG. 31 is an example diagram showing conditions for determining the bandwidth of an edge, in accordance with some embodiments.

Referring to FIG. 31, a read bound Rb, an individual bound Ib, and a write bound Wb are determined at one edge, the minimum value of which may be a final bandwidth value for that edge. However, since the read bound Rb and the write bound Wb may vary depending on circumstances, the final bandwidth may not be determined directly by comparing the three values.

First, an edge whose individual bound Ib out of the read bound Rb, individual bound Ib, and write bound Wb has a minimum value that may be found, then the final bandwidth of the edge may be determined as the value of the individual bound Ib.

Since the value of the read bound Rb and the value of the write bound Wb can grow larger but cannot shrink or become smaller, the value of the individual bound Ib can be determined as the final bandwidth value regardless of other conditions, if the individual bound Ib has the minimum value.

Figure 32:
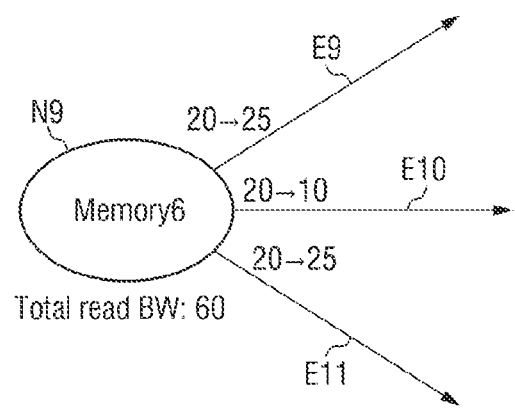
FIG. 32 is an example diagram showing redistribution of a read bound of an edge in accordance with some embodiments.

FIG. 32 is an example diagram showing redistribution of a read bound of an edge, in accordance with various embodiments.

Referring to FIG. 32, when a final bandwidth value of at least one edge is determined, the value of a read bound Rb or the value of a write bound Wb of another edge may vary. Specifically, when the value of the tenth edge E10 is determined from 20 to 10 under a condition, the individual bound Ib has the minimum value, as shown in FIG. 31, and the remaining value of 50 is obtained by subtracting 10 from 60, that is the total read bandwidth value can be distributed evenly. That is, the ninth edge E9 and the eleventh edge E11 may each have a read bound Rb of 25. The write bound Wb may also be redistributed in a similar way as the read bound Rb.

After the redistribution is made, the read bound Rb, the individual bound Ib, and the write bound Wb may be compared again. If the individual bound Ib has the minimum value, the value of the final bandwidth for the edge may be determined. After that, the value of the read bound Rb and the value of the write bound Wb may be redistributed again.

If this method is repeated and there is no longer an edge whose individual bound Ib has the minimum value, the final bandwidth may be found through other conditions.

Figure 33:
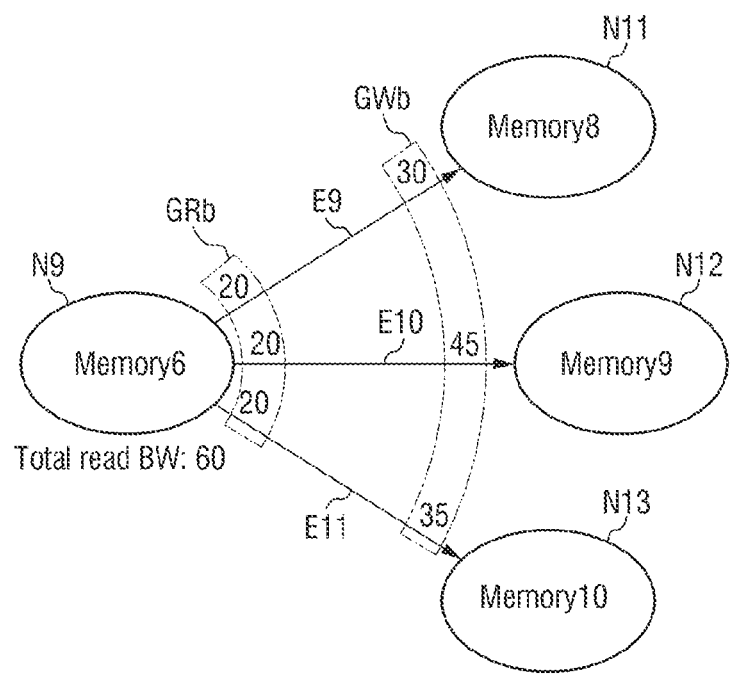
FIG. 33 is an example diagram showing conditions for determining the final bandwidth of an edge in accordance with some embodiments.

FIG. 33 is an example diagram showing conditions for determining the final bandwidth of an edge, in accordance with various embodiments.

Referring to FIG. 33, a read bound group GRb, including all read bounds Rb of edges departing from one node, may be defined. At that time, a write bound group GWb, including all write bounds Wb of each edge, may also be defined.

By comparing the read bound group GRb and the write bound group GWb, if the read bound group GRb is less than or equal to the write bound group GWb, then the final bandwidth values of all edges may be determined as the read bounds Rb. In this case, the comparison of the read bound group GRb and the write bound group GWb may be a comparison of the read bound Rb and the write bound Wb of the same edge. That is, it can be determined that the above condition is satisfied only if the read bound Rb is smaller than the write bound Wb for all edges, and that the above condition is not satisfied if the write bound Wb is smaller than the read bound Rb for any edge.

Once the final bandwidths of some edges are determined in this way, the read bounds Rb and write bounds Wb of the remaining edges may be redistributed again. Subsequently, an edge whose individual bound Ib has the minimum may be found again, and a group comparison as above may be performed again. By repeating this process, the final bandwidths for all edges can ultimately be determined.

Referring again to FIG. 24, the third pre-event model Evm_p3 may be a model in which the final bandwidth value of each edge has been determined. The duration decision module Ddm may receive the third pre-event model Evm_p3. The duration decision module Ddm may determine bandwidth durations according to bandwidths using the final bandwidth of each edge. In this case, the bandwidth duration may refer to a work time generated by the final bandwidth.

The duration decision module Ddm may determine the final duration once the bandwidth duration is determined. The final duration may refer to a required time of an event determined for each edge.

If a node is a part for the core agent Ag_core, the duration of the compute job Cj may be the final duration of the edge departing from that node. If a node is a part for the memory agent Ag_Mem, the duration of the memory job Mj may be the final duration of the edge departing from that node. In this case, the duration of the memory job Mj may be determined by taking the initial latency and the bandwidth duration into account. The larger the final bandwidth value, the smaller the bandwidth duration can be. Conversely, the smaller the final bandwidth value, the larger the bandwidth duration can be.

Figure 34:
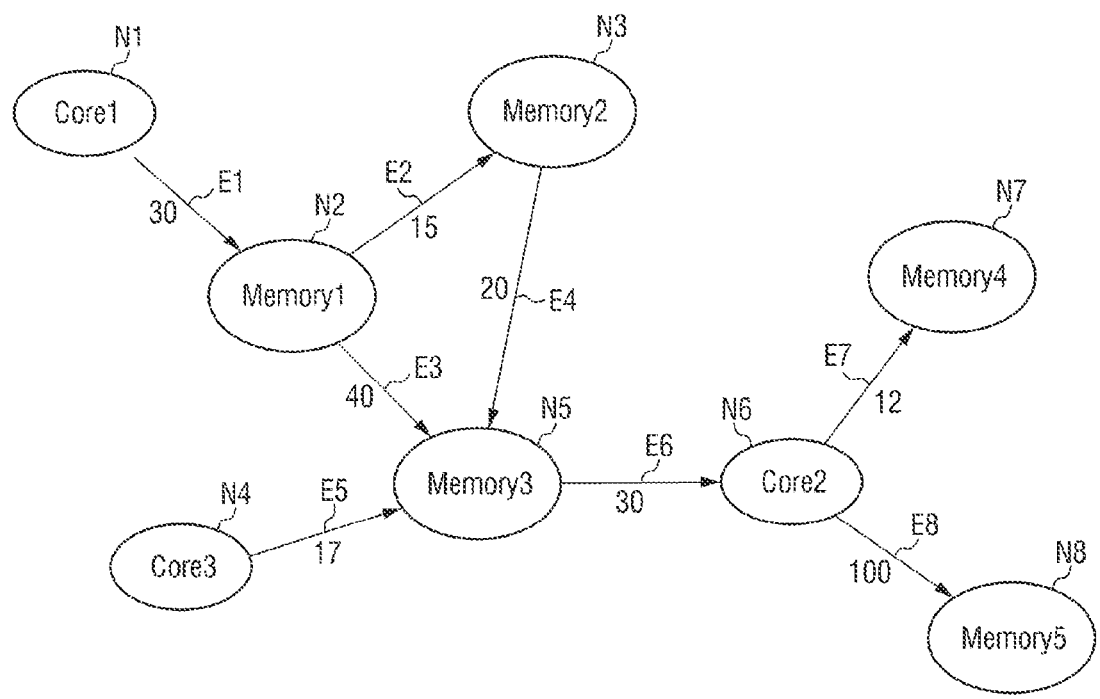
FIG. 34 is an example diagram showing final durations of an event model in which a final bandwidth has been determined in accordance with some embodiments.

FIG. 34 is an example diagram showing final durations of an event model in which final bandwidths have been determined, in accordance with various embodiments.

Referring to FIG. 34, a final duration may be determined for each edge of the event model Evm. In this case, the final duration may represent the performance of hardware by the time each event takes.

Referring again to FIG. 22, the event simulation module Esm may generate the performance measurement result O_pf using the event model Evm. The event simulation module Esm can measure the total duration taken for the calculation task Task through the event model Evm. Through this, the speed and performance of the hardware can be determined.

Figure 35:
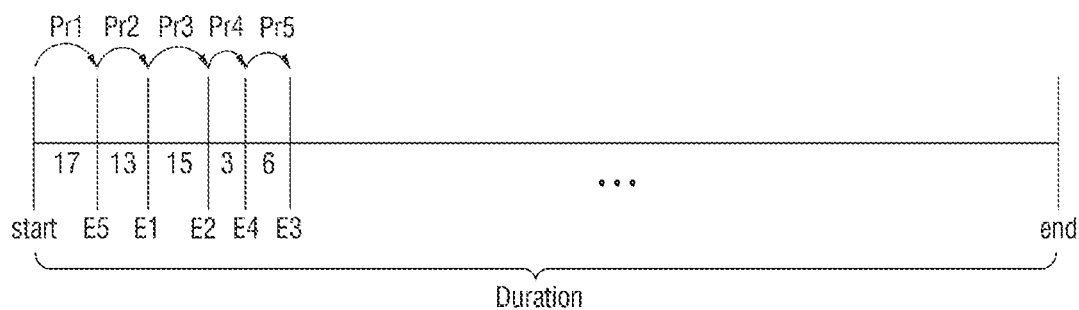
FIG. 35 is a graph showing simulation for measuring a total duration in accordance with some embodiments.

FIG. 35 is a graph showing a simulation for measuring a total duration, in accordance with various embodiments.

Referring to FIGS. 22, 34, and 35, the event simulation module Esm may find an edge that ends earliest. The edge that ends earliest in FIG. 34 may be the fifth edge E5. That is, as all edges but the first edge E1 and the fifth edge E5 start after the other edges end, the first edge E1 and the fifth edge E5 start at the same time, and the fifth edge E5 whose final duration is 17 may end first.

The event simulation module Esm may perform a first process Pr1 that moves to the time point at which the fifth edge E5 ends. In this case, the first process Pr1 may be a process that moves to the time point at which the final duration of 17 has progressed. The first process Pr1 may be the smallest time unit in which the same status is maintained since other states of the event model Evm do not change while the final duration of 17 is changed.

Subsequently, the event simulation module Esm may remove the fifth edge E5 that has been completed. Accordingly, the number of edges arriving at the fifth node N5 changes, and thus, the write bounds of the third edge E3 and the fourth edge E4 may change. Therefore, the final bandwidth, the bandwidth duration, and the final duration of the third edge E3 and the fourth edge E4 may also change.

The event simulation module Esm may newly generate an event model Evm in a changed state. In this case, the task of regenerating the event model Evm may be assigned to the event modeling module Em instead of the event simulation module Esm.

When the event model Evm is regenerated, then a second process Pr2 may proceed by the event simulation model Esm. For example, the second process Pr2 may be what the first edge E1 is performed. This is because there is no edge to be performed other than the first edge E1 according to event dependencies.

When the second process Pr2 ends, the first edge E1 may also be removed, and the event model Evm may be regenerated. Each edge may be performed one by one in this way, and the event simulation module Esm may accumulate each respective duration to generate a total duration.

This total duration may be a measure for measuring the performance of virtual hardware by means of the hardware information System spec. and Design spec.

The device for measuring performance in accordance with the embodiment can measure the overall performance in a much shorter time by carrying out an event in units of duration without spending actual calculation time. In the case of an actual deep learning calculation task, durations of at least tens of thousands of cycles are needed, but the embodiment can measure performance with calculations of about several seconds only.

Furthermore, since performance can be checked quickly by simply inputting only hardware information System spec. and Design spec., even if there is no hardware implementation or implementation of a virtual simulation device according thereto, the measurement of performance can be performed very easily in the hardware design stage.

Moreover, since all hardware elements are modeled as agents Ag, restrictions necessary in hardware, such as a preload distance, can also be implemented in simulation without limitation. In this case, the preload distance refers to limiting the range to which commands are transmitted, according to the relative location of hardware.

Hereinafter, a device for measuring performance in accordance with some embodiments will be described with reference to FIGS. 22 and 36. Any description overlapping with the embodiments described above will be simplified or omitted.

Figure 36:
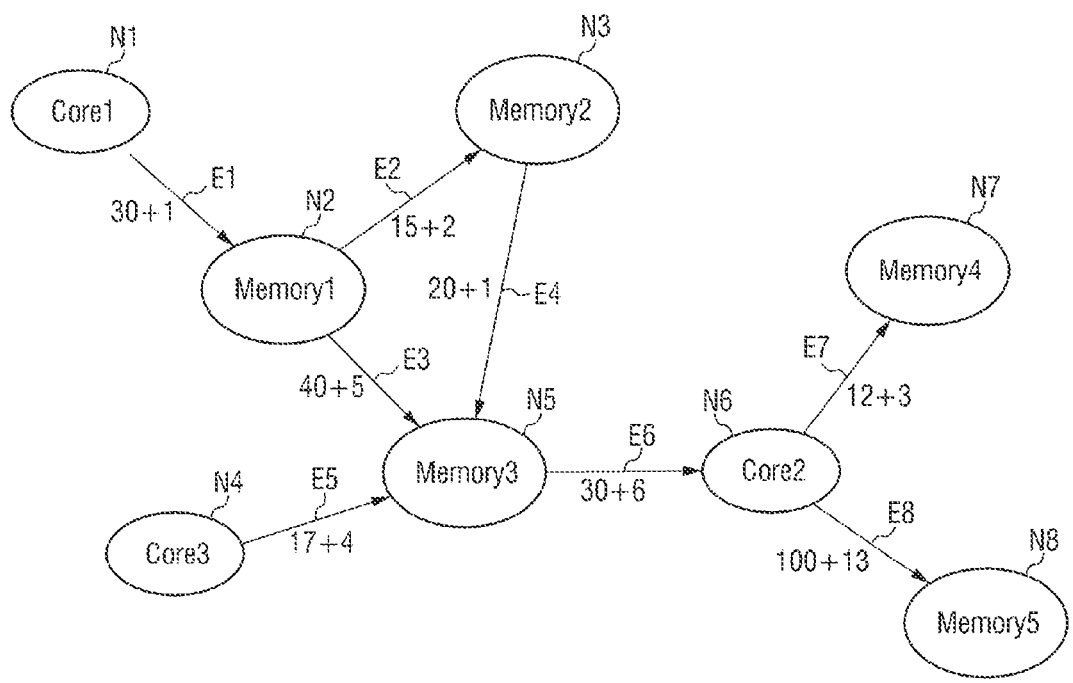
FIG. 36 is an example diagram showing a device for measuring performance of a neural processing device in accordance with some embodiments.

FIG. 36 is an example diagram showing a device for measuring performance of a neural processing device in accordance with some embodiments.

Referring to FIGS. 22 and 36, the event modeling module Em can compute not just the final duration, but also synchronization durations.

That is, 30 at the first edge E1 is the final duration of FIGS. 34, and 1, which has been added. Further, it may be a synchronization duration over which a synchronization signal is transmitted. In this case, the synchronization signal is a signal indicating that a task has been completed by the previous agent and that the next agent can perform a subsequent task only after it receives a synchronization signal.

Therefore, the device for measuring performance in accordance with the embodiment can determine synchronization durations in advance through the hardware information System spec. and Design spec., and it is possible to measure performance more precisely by taking the synchronization durations into account.

Hereinafter, a method for measuring performance of a neural processing device in accordance with some embodiments will be described with reference to FIGS. 22, 24, and 37 to 40. Any description overlapping with the embodiments described above will be simplified or omitted.

Figure 37:
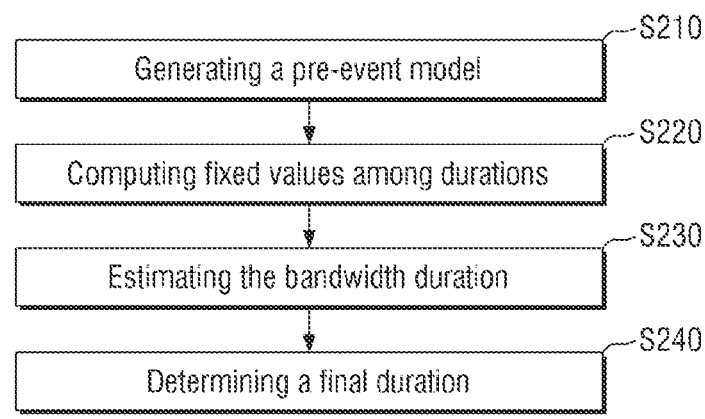
FIG. 37 is a flowchart showing a method for measuring performance of a neural processing device in accordance with some embodiments.
Figure 38:
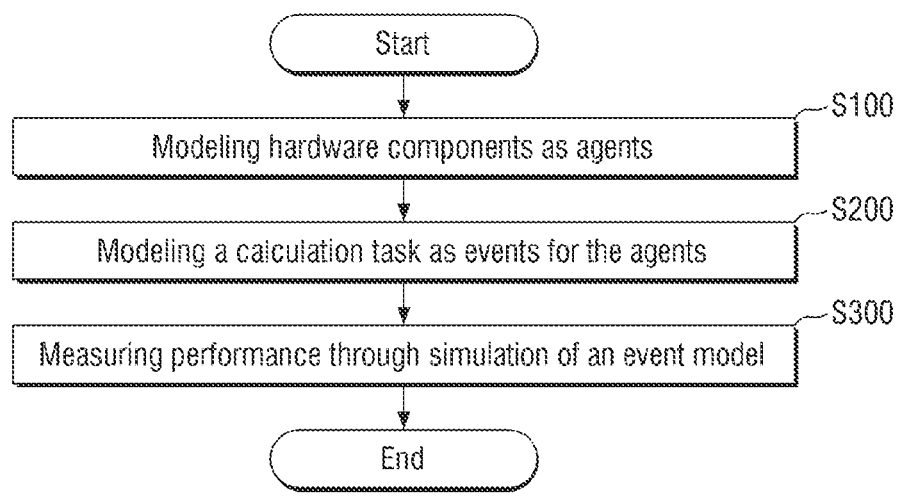
FIG. 38 is a flowchart showing modeling as events in accordance with FIG. 37 in further detail.
Figure 39:
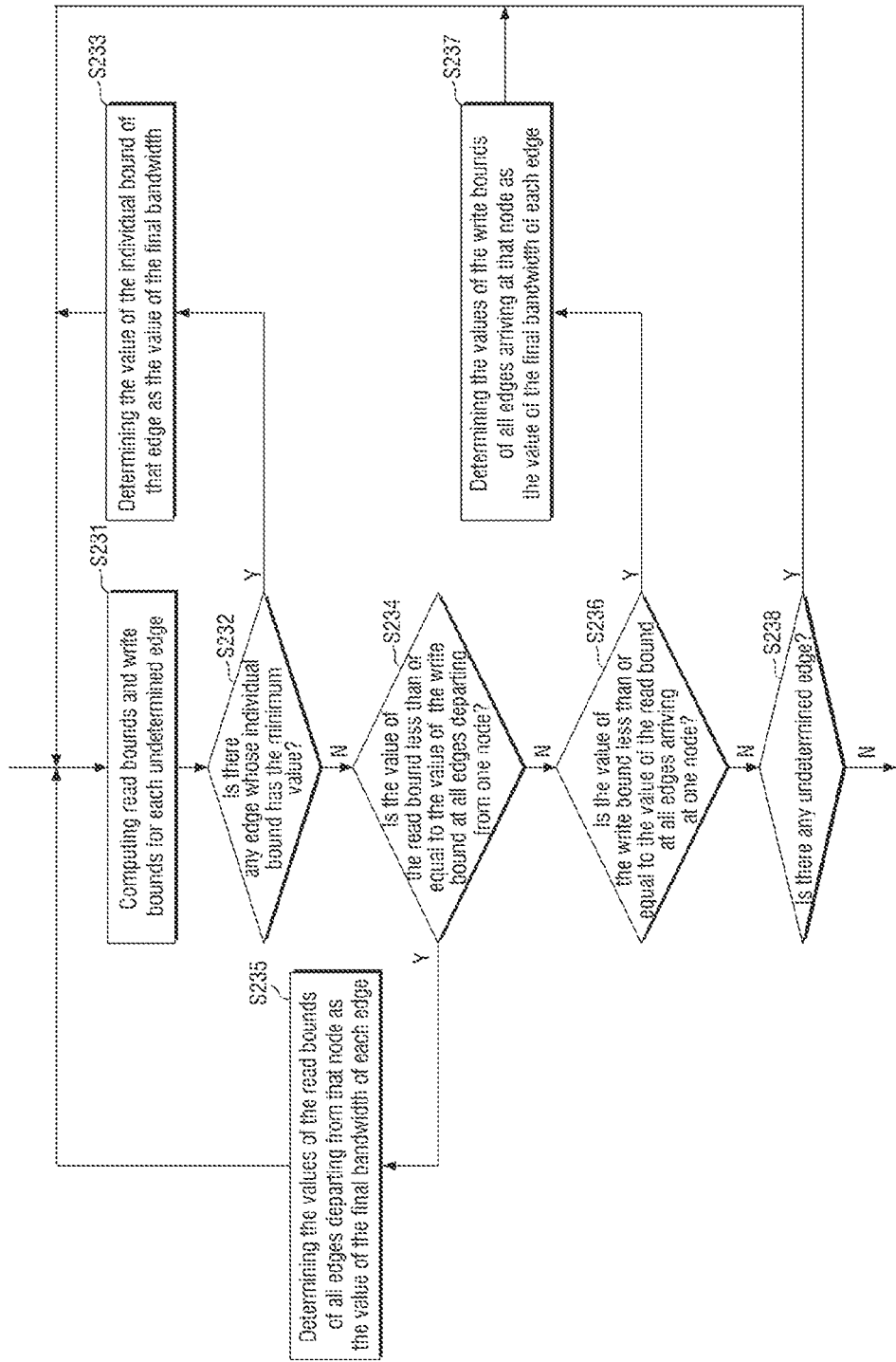
FIG. 39 is a flowchart showing estimating of the bandwidth duration in accordance with FIG. 38 in further detail.
Figure 40:
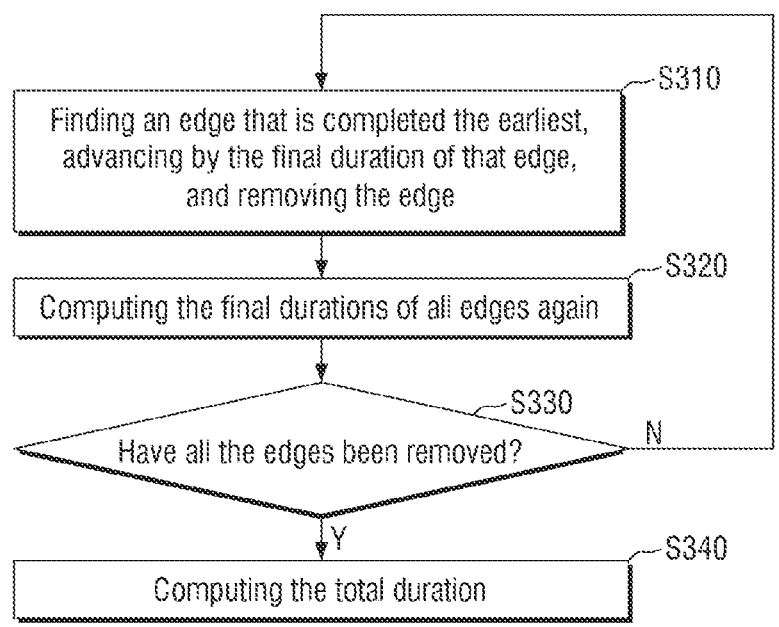
FIG. 40 is a flowchart showing measuring performance in accordance with FIG. 37 in further detail.

FIG. 37 is a flowchart showing a method for measuring performance of a neural processing device in accordance with some embodiments. FIG. 38 is a flowchart showing modeling as events in accordance with FIG. 37 in further detail. FIG. 39 is a flowchart showing estimating of the bandwidth duration in accordance with FIG. 38 in further detail. FIG. 40 is a flowchart showing measuring performance in accordance with FIG. 37 in further detail.

Referring to FIG. 37, hardware components are modeled as agents at S100.

Specifically, referring to FIG. 22, the hardware modeling module Hm may receive hardware information System spec. and Design spec. and generate a hardware model Hwm. The hardware modeling module Hm may express each hardware component as an agent through the hardware information System spec. and Design spec.

Referring again to FIG. 37, a calculation task is modeled as events for the agents at S200.

In detail, referring to FIG. 38, a pre-event model is generated at S210.

Specifically, referring to FIG. 24, the event model generating module Emm may receive the hardware model Hwm and a calculation task Task. The event model generating module Emm may generate a first pre-event model Evm_p1 based on the hardware model Hwm. The first pre-event model Evm_p1 may divide the calculation task Task into units of events and express the calculation task Task as nodes and edges.

Referring again to FIG. 38, fixed values among durations are computed at S220.

Specifically, referring to FIG. 24, the calculation module Cm may receive the hardware information System spec. and Design spec. The calculation module Cm may compute a duration of a compute job Cj and an initial latency of a memory job Mj through the hardware information. Accordingly, all the rest values of the durations other than the bandwidth duration of each edge may be computed. As such, fixed values may be computed in the first pre-event model Evm_p1 to thereby generate a second pre-event model Evm_p2.

Referring again to FIG. 38, the bandwidth duration is estimated at S230.

In detail, referring to FIG. 39, read bounds and write bounds for each undetermined edge are computed at S231.

Specifically, referring to FIGS. 29 and 30, for example, if three edges, i.e., a ninth edge E9, a tenth edge E10, and an eleventh edge E11 depart from a ninth node N9, each edge thereof may be evenly assigned the total read bandwidth value as the read bound Rb. Accordingly, each edge may be evenly assigned a total read bandwidth value of 60 and have 20 as a read bound Rb, respectively.

In addition, if three edges, e.g., a twelfth edge E12, a thirteenth edge E13, and a fourteenth edge E14, arrive at a tenth node N10, each edge thereof may be evenly assigned the total write bandwidth value as the write bound Wb. Accordingly, each edge may be evenly assigned a total write bandwidth value of 90 and have 30 as a write bound Wb, respectively.

Referring again to FIG. 39, it is determined whether there is any edge whose individual bound has the minimum value at S232. If there is, the value of the individual bound of that edge is determined as the value of the final bandwidth at S233. In this case, the step S231 may be repeated again.

Specifically, referring to FIG. 31, first, an edge whose individual bound Ib out of the read bound Rb, individual bound Ib, and write bound Wb has the minimum value is found, and the value of the individual bound Ib is determined as the value of the final bandwidth of that edge. Since the read bound Rb and the write bound Wb can grow larger but cannot shrink or become smaller, the individual bound Ib can be determined as the final bandwidth value regardless of other conditions if the individual bound Ib has the minimum value.

Referring to FIG. 32, when a final bandwidth value of at least one edge is determined, the value of a read bound Rb or a write bound Wb of another edge may vary. Specifically, when the value of the tenth edge E10 is determined from 20 to 10 under the condition, the individual bound Ib has the minimum value, as shown in FIG. 31, the remaining 50 obtained by subtracting 10 from 60 that is the total read bandwidth value can be distributed evenly. That is, the ninth edge E9 and the eleventh edge E11 may each have a read bound Rb of 25. The write bound Wb may also be redistributed in a similar way as the read bound Rb.

Referring again to FIG. 39, if there is no edge whose individual bound has the minimum value, it is determined whether the value of the read bound is less than or equal to the value of the write bound at all edges departing from one node at S234. If so, the values of the read bounds of all edges departing from that node are determined as the value of the final bandwidth of each edge at S235. Subsequently, the step S231 is repeated again.

If not, in the step S234 it is determined whether the value of the write bound is less than or equal to the value of the read bound at all edges arriving at one node at S236. If so, the values of the write bounds of all edges arriving at that node are determined as the value of the bandwidth duration of each edge at S237. Subsequently, the step S231 is repeated again.

Specifically, referring to FIG. 33, by comparing the read bound group GRb and the write bound group GWb, if the read bound group GRb is less than or equal, then the final bandwidth values of all edges may be determined as the read bounds Rb. In this case, the comparison of the read bound group GRb and the write bound group GWb may be a comparison of the read bound Rb and the write bound Wb of the same edge. That is, it can be determined that the above condition is satisfied only if the read bound Rb is smaller than the write bound Wb for all edges, and that the above condition is not satisfied if the write bound Wb is smaller than the read bound Rb for any edge. Once the final bandwidths of some edges are determined in this way, the read bounds Rb and write bounds Wb of the remaining edges may be redistributed again.

Referring again to FIG. 39, if not, in the step S236 it is determined whether there is any undetermined edge at S238. If there is an undetermined edge, the method proceeds to the step S231 again, and otherwise, the bandwidth estimation ends.

Referring again to FIG. 38, the final duration is determined at S240.

Specifically, referring to FIG. 24, the duration decision module Ddm may determine the final duration once the bandwidth duration is determined. The final duration may refer to a required time of an event determined for each edge.

Referring again to FIG. 37, performance is measured through simulation of an event model at S300.

In detail, referring to FIG. 40, an edge that is completed the earliest is found and advances by the final duration of that edge, and the edge is removed at S310.

Specifically, referring to FIGS. 22, 34, and 35, the event simulation module Esm can find an edge that ends the earliest. The edge that ends the earliest in FIG. 34 may be the fifth edge E5. That is, as all edges but the first edge E1 and the fifth edge E5 start after the other edges end, the first edge E1 and the fifth edge E5 start at the same time, and the fifth edge E5 whose final duration is 17 may end first. Subsequently, the event simulation module Esm may remove the fifth edge E5 that has been completed. Accordingly, the number of edges arriving at the fifth node N5 changes, and thus, the write bounds of the third edge E3 and the fourth edge E4 may change.

Referring again to FIG. 40, the final durations of all edges are computed again at S320.

Specifically, referring to FIGS. 22, 34, and 35, the event simulation module Esm may newly generate an event model Evm in a changed state. In this case, the task of regenerating the event model Evm may be assigned to the event modeling module Em instead of the event simulation module Esm.

Referring again to FIG. 40, it is determined whether all the edges have been removed at S330. If not, the step S310 is started again. If so, the total duration is computed at S340.

Specifically, referring to FIGS. 22, 34, and 35, the event simulation module Esm can generate a total duration by accumulating durations of all processes including the first to fifth processes Pr1 to Pr5.

The method for measuring performance of the neural processing device in accordance with the embodiment can measure performance much more simply by carrying out events in units of duration. In addition, its performance can be determined relatively accurately without actually implementing a device or creating a simulator.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the embodiments be considered in all respects as illustrative and not restrictive, reference being made to the appended claims rather than the foregoing description to indicate the scope of the disclosure.

What is claimed is:

1. A method for measuring performance of a neural processing device, comprising:
   receiving, at a processor, hardware information associated with the neural processing device;
   modeling, via the processor, hardware components as agents, according to the hardware information;
   generating, via the processor an event model by dividing a calculation task by events for the agents and modeling the calculation task, wherein the event model includes nodes corresponding to the agents and edges corresponding to the events; and
   measuring, via the processor, a total duration of the calculation task through simulation of the event model based on durations of the edges, each of the edges is data transmission between nodes, wherein at least one duration of the durations of the edges is updated by removing an edge.

2. The method for measuring performance of the neural processing device of claim 1, wherein generating the event model further comprises the processor performing operations including:
   generating a pre-event model that comprises at least one undetermined duration,
      wherein the nodes and the edges are formed in the pre-event model, and
      wherein each of the at least one undetermined duration comprises a fixed duration determined according to the hardware information and a bandwidth duration determined by at least one bandwidth;
   computing the fixed duration;
   estimating the bandwidth duration;
   determining a value of each of the at least one undetermined duration through the fixed duration and the bandwidth duration; and
   converting each of the at least one undetermined duration into a final duration.

3. The method for measuring performance of the neural processing device of claim 2, wherein estimating the bandwidth duration comprises the processor performing operations including:
   distributing a value of a total read bandwidth of each of the nodes evenly to a value of a read bound for each of the edges departing from each of the nodes;
   distributing a value of a total write bandwidth for each of the nodes evenly to a value of a write bound for each of the edges arriving at each of the nodes;
   determining a minimum value, as a final bandwidth, for each of the edges out of the read bound, the write bound, and an individual bound, determined according to the hardware information; and
   estimating the bandwidth duration according to the determined final bandwidth.

4. The method for measuring performance of the neural processing device of claim 3, wherein determining the minimum value as the final bandwidth further comprises the processor performing operations including:
   determining the individual bound as the final bandwidth of at least one of the edges whose individual bound is smaller than the read bound and the write bound; and
   resetting the read bound and the write bound evenly except for the at least one of the edges whose final bandwidth has been determined.

5. The method for measuring performance of the neural processing device of claim 4, wherein determining the minimum value as the final bandwidth further comprises the processor performing operations including:
   if there is no edge whose individual bound is smaller than the read bound and the write bound and if the read bound of each of all the edges departing from one node is less than or equal to the write bound of each of all the edges, determining the read bound of each of the edges as the final bandwidth of each of the edges; and
   resetting the write bound evenly, except for edges whose final bandwidth has been determined.

6. The method for measuring performance of the neural processing device of claim 4, wherein determining the minimum value as the final bandwidth further comprises the processor performing operations including:
   if there is no edge whose individual bound is smaller than the read bound and the write bound and if the write bound of each of all the edges arriving at one node is less than or equal to the read bound of each of all the edges, determining the write bound of each of the edges as the final bandwidth of each of the edges; and
   resetting the read bound evenly except for edges whose final bandwidth has been determined.

7. The method for measuring performance of the neural processing device of claim 2, wherein the event comprises:
   a compute job; and
   a memory job,
   wherein a duration of the compute job is determined according to the hardware information,
   wherein a duration of the memory job comprises an initial latency determined according to the hardware information plus the bandwidth duration determined dynamically according to a final bandwidth, and
   wherein the fixed duration comprises the duration of the compute job and the initial latency.

8. The method for measuring performance of the neural processing device of claim 1, wherein measuring the total duration comprises the processor performing operations including:
advancing time by a final duration of an edge that is completed earliest among the edges;
removing the edge that is completed the earliest;
computing a final duration of each of all the edges again; and
measuring the total duration by summing the advanced time if all the edges have been removed.

9. The method for measuring performance of the neural processing device of claim 1, wherein the hardware information comprises at least one of a clock frequency, a memory size, an initial latency that exists for data transfer between memories independent of data amount, a total bandwidth including an overall read bandwidth and an overall write bandwidth of a memory, a maximum multiple outstanding indicating a maximum number of requests that one hardware element can transmit, or a maximum bandwidth of a hardware component.

10. The method for measuring performance of the neural processing device of claim 1, wherein the hardware information comprises at least one of system specifications or design specifications before implementation of the neural processing device.

11. A device for measuring performance, comprising processing circuitry, comprising: a hardware modeling module configured to:
receive hardware information associated with a neural processing device; and
generate a hardware model by modeling hardware components as agents;
an event modeling module configured to:
receive the hardware information and a calculation task; and
generate an event model by dividing the calculation task by events for the agents based on the hardware model, wherein the event model includes nodes corresponding to the agents and edges corresponding to the events; and
an event simulation module configured to measure performance of the neural processing device by simulating the event model based on durations of the edges, each of the edges is data transmission between nodes, wherein at least one duration of the durations of the edges is updated by removing an edge.

12. The device for measuring performance of claim 11, wherein the agents comprise:
core agents for processing units included in the neural processing device; and
memory agents for memories included in the neural processing device.

13. The device for measuring performance of claim 12, wherein each of the events comprises:
a compute job performed by the core agents; and
a memory job according to data transfer between the memory agents.

14. The device for measuring performance of claim 12, wherein each of the memory agents comprises:
at least one load unit agent; and
at least one store unit agent,
wherein the load unit agent and the store unit agent are present in each of the memories.

15. The device for measuring performance of claim 11, wherein the event modeling module comprises:
an event model generating module configured to generate a first pre-event model according to the hardware model by dividing the calculation task by the events, wherein the nodes and the edges are formed in the first pre-event model, and wherein durations of the edges are undetermined;
a calculation module configured to generate a second pre-event model by computing fixed values out of the durations of the first pre-event model according to the hardware information;
a bandwidth estimation module configured to generate a third pre-event model by determining bandwidth durations of the second pre-event model; and
a duration decision module configured to receive the third pre-event model to determine final durations and generate the event model.

16. The device for measuring performance of claim 15, wherein the event simulation module advances time by one of the final durations and each of the final durations is associated with each of the edges, and
wherein, when the final duration of an edge is completed the earliest among the edges of the event model, the event simulation module removes the edge whose final duration is completed the earliest and computes the final durations of each of the edges again.

17. The device for measuring performance of claim 11, wherein the neural processing device comprises:
a central processing unit (CPU) configured to perform a first calculation;
a neural core system-on-a-chip (SoC) configured to perform a second calculation that is different from the first calculation; and
an off-chip memory configured to store data of the CPU and the neural core SoC.

18. The device for measuring performance of claim 17, wherein the neural core SoC comprises:
at least one neural processor;
a shared memory that is shared by the at least one neural processor; and
a global interconnection configured to transmit data between the at least one neural processor and the shared memory.

19. The device for measuring performance of claim 18, wherein the global interconnection comprises:
a data channel configured to communicate data;
a control channel configured to communicate control signals; and
a level 3 synchronization (L3 sync) channel configured to communicate synchronization signals.

20. The device for measuring performance of claim 19, wherein the event simulation module measures a total duration by accounting for synchronization durations.

* * * * *